(12) United States Patent
Ciochina et al.

(10) Patent No.: US 11,824,606 B2
(45) Date of Patent: Nov. 21, 2023

(54) COMMUNICATION DEVICES AND METHODS

(71) Applicant: SONY GROUP CORPORATION, Tokyo (JP)

(72) Inventors: Dana Ciochina, Stuttgart (DE); Thomas Handte, Stuttgart (DE); Nabil Sven Loghin, Stuttgart (DE); Felix Fellhauer, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/603,589

(22) PCT Filed: Apr. 20, 2020

(86) PCT No.: PCT/EP2020/060967
§ 371 (c)(1),
(2) Date: Oct. 14, 2021

(87) PCT Pub. No.: WO2020/216703
PCT Pub. Date: Oct. 29, 2020

(65) Prior Publication Data
US 2022/0200678 A1   Jun. 23, 2022

(30) Foreign Application Priority Data
Apr. 23, 2019   (EP) .................................... 19170589

(51) Int. Cl.
*H04B 7/06*   (2006.01)
*H04B 7/0452*   (2017.01)

(52) U.S. Cl.
CPC ......... *H04B 7/0617* (2013.01); *H04B 7/0452* (2013.01); *H04B 7/0626* (2013.01); *H04B 7/0634* (2013.01)

(58) Field of Classification Search
CPC .................................................... H04B 7/0617
(Continued)

(56) References Cited

U.S. PATENT DOCUMENTS

2010/0164802 A1* 7/2010 Li .......................... H01Q 1/246
                                                                342/368
2013/0148538 A1* 6/2013 Ohwatari ............... H04J 11/005
                                                                370/252

(Continued)

FOREIGN PATENT DOCUMENTS

CN    107734514 A    2/2018
CN    109155660 A    1/2019
(Continued)

OTHER PUBLICATIONS

International Search Report and Written Opinion dated Jun. 2, 2020, received for PCT Application PCT/EP2020/060967, Filed on Apr. 20, 2020, 12 pages including English Translation.

(Continued)

*Primary Examiner* — Lihong Yu
(74) *Attorney, Agent, or Firm* — XSENSUS LLP

(57) ABSTRACT

A first communication device that simultaneously transmits to a group of two or more second communication devices using multi-user multiple input multiple output (MU-MIMO) communication performs beamforming training with a selected second communication device of said group of second communication devices by transmitting one or more training units, wherein an analog beamforming training matrix and/or a digital beamforming training matrix adapted for beamforming training with the selected second communication device are applied on the one or more training units, receiving from the selected second communication device feedback in response to the transmitted transmit packets, and determining, for use in the simultaneous transmission of data to a group of two or more second (Continued)

communication devices including the selected second communication device, an updated analog beamforming matrix and/or an updated digital beamforming matrix based at least on the received feedback.

20 Claims, 12 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2013/0315325 A1 | 11/2013 | Wang | |
| 2016/0043787 A1 | 2/2016 | Lee | |
| 2017/0222855 A1* | 8/2017 | Liu | H04B 7/0452 |
| 2017/0366244 A1* | 12/2017 | Lee | H04B 7/0619 |
| 2018/0091281 A1* | 3/2018 | Kasher | H04B 7/0452 |
| 2019/0097712 A1 | 3/2019 | Singh et al. | |
| 2020/0195325 A1* | 6/2020 | Yuan | H04B 7/0486 |
| 2021/0143887 A1* | 5/2021 | Oteri | H04W 74/0816 |

FOREIGN PATENT DOCUMENTS

| | | |
|---|---|---|
| CN | 109417418 A | 3/2019 |
| EP | 3240201 A1 | 11/2017 |
| WO | WO-2017196900 A1 | 11/2017 |
| WO | 2018/017977 A1 | 1/2018 |
| WO | 2020/216703 A1 | 10/2020 |

OTHER PUBLICATIONS

"Part 11: Wireless LAN Medium Access Control (MAC) and Physical Layer (PHY) Specifications", IEEE Computer Society, IEEE Standard for Information technology, IEEE Std 802.11™—2016, Dec. 7, 2016, pp. 1-3532.

3GPP tsg_ran\WG1_RL1 Jan. 11, 2018 TDoc_List_Meeting_RAN1#87.

* cited by examiner

COMMUNICATION DEVICES AND METHODS

CROSS-REFERENCE TO RELATED APPLICATIONS

The present application is based on PCT filing PCT/EP2020/060967, filed Apr. 20, 2020, which claims priority to EP 19170589.6, filed Apr. 23, 2019, the entire contents of each are incorporated herein by reference.

BACKGROUND

Field of the Disclosure

The present disclosure relates to communication devices and method, in particular for performing multi-user multiple input multiple output (MU-MIMO) communication.

Description of Related Art

To compensate for the large path loss and to reduce crosstalk between multiple antennas and/or at multiple stations (also called communication devices herein), two kinds of beamforming are employed in mmWave communication (i.e., communication around and/or above 30 GHz). Firstly, analog beamforming (ABF) is performed which comprises steering beams, whose characteristics are given by the settings of phase shifters within phased antenna arrays (PAAs). This ensures that there is a sufficient link budget at each user as a primary objective. Secondly, digital beamforming (DBF) is performed which applies amplifications and phases to all transmit streams over the RF chains connected to the antennas in order to limit the interference between various user devices (also simply called users herein) and/or various streams. Further, digital beamforming allows to balance transmit powers and increase rates observed by the users (water filling or bit loading, respectively). The combination of analog and digital beamforming is commonly referred to as hybrid beamforming.

Due to the spatial separation and/or different polarization offered by the multiple antenna arrays several users can be served simultaneously, thus increasing the spectral efficiency. Serving multiple users at the same time by means of spatial or polarization separation is commonly referred to as multi user (MU) multiple-input multiple-output (MIMO) transmission. The set of users served at the same time within an MU MIMO transmission is commonly referred to as MU group.

However, there are several hurdles to enable MU MIMO transmission. Firstly, finding the appropriate analog beams for the users in the groups is a time consuming search problem. Moreover, digital beamforming comes with additional complexity due to the need for channel information at the transmitter side, which in general involves obtaining feedback from the peer communication devices. It is known that significant computation complexity is caused by determination and assembly of feedback reports even for simple channel estimates. Furthermore, if explicit digital beamforming in OFDM (i.e., frequency selective) cases is used, large beamforming matrices fora large number of subcarriers need to be computed and reported.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to enable beamforming corrections by communication devices and methods used in MU MIMO communication in an efficient manner, in particular without disrupting the transmission to stable communication devices of a MU group and without requiring large feedback reports from communication devices of the MU group. It is a further object to provide a corresponding computer program and a non-transitory computer-readable recording medium for implementing the communication methods.

According to an aspect there is provided a first communication device comprising circuitry configured to
  simultaneously transmit to a group of two or more second communication devices using multi-user multiple input multiple output, MU-MIMO, communication;
  perform beamforming training with a selected second communication device of said group of second communication devices by
    transmitting one or more transmit packets including one or more training units, wherein an analog beamforming training matrix and/or a digital beamforming training matrix adapted for beamforming training with the selected second communication device are applied on the one or more training units,
    receiving from the selected second communication device feedback in response to the transmitted transmit packets, said feedback including beamforming information determined by the selected second communication device based on the reception of the transmit packets, and
    determining, for use in the simultaneous transmission of data to a group of two or more second communication devices including the selected second communication device, an updated analog beamforming matrix based on the analog beamforming training matrix and the received feedback and/or an updated digital beamforming matrix based on the digital beamforming training matrix and/or the received feedback.

According to a further aspect there is provided second communication device comprising circuitry configured to
  communicate with a first communication device that is configured to simultaneously transmit to a group of two or more second communication devices using multi-user multiple input multiple output, MU-MIMO, communication;
  perform beamforming training with the first communication device by
    receiving one or more transmit packets including one or more training units, wherein an analog beamforming training matrix and/or a digital beamforming training matrix adapted for beamforming training with the second communication device are applied on the training units by the first communication device,
    determining beamforming information based on the reception of the transmit packets, and
    transmitting to the first communication device feedback in response to the received transmit packets, said feedback including the determined beamforming information.

According to another aspect there is provided a first communication method comprising simultaneously transmitting to a group of two or more second communication devices using multi-user multiple input multiple output, MU-MIMO, communication;

performing beamforming training with a selected second communication device of said group of second communication devices by transmitting one or more transmit packets including one or more training units, wherein an analog beamforming training matrix and/or a digital beamforming training matrix adapted for beamforming training with the selected second communication device are applied on the one or more training units, receiving from the selected second communication device feedback in response to the transmitted transmit packets, said feedback including beamforming information determined by the selected second communication device based on the reception of the transmit packets, and determining, for use in the simultaneous transmission of data to a group of two or more second communication devices including the selected second communication device, an updated analog beamforming matrix based on the analog beamforming training matrix and the received feedback and/or an updated digital beamforming matrix based on the digital beamforming training matrix and/or the received feedback.

According to a further aspect there is provided second communication method comprising communicating with a first communication device that is configured to simultaneously transmit to a group of two or more second communication devices using multi-user multiple input multiple output, MU-MIMO, communication;

performing beamforming training with the first communication device by receiving one or more transmit packets including one or more training units, wherein an analog beamforming training matrix and/or a digital beamforming training matrix adapted for beamforming training with the second communication device are applied on the training units by the first communication device, determining beamforming information based on the reception of the transmit packets, and transmitting to the first communication device feedback in response to the received transmit packets, said feedback including the determined beamforming information.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication devices and as defined in the dependent claims and/or disclosed herein.

It is specific to mmWave communication that the coherence time of the effective channel (effective after analog beamforming) is dependent on the beamwidth and pointing directions of the analog beams. Users at less favorable angles with respect to antenna boresight may thus require channel estimation and beam tracking more often.

If one or a small number of stations (STAs; also called "second communication devices" herein) within an MU group, with which an access point (AP; also called "first communication device" herein) can simultaneously communicate, require tracking at a certain time whereas the other stations of the MU group have stable channels, it is possible to perform corrections to analog and/or digital beamforming matrices and still maintain the MU communication. Known techniques currently allow tracking only for single user mmWave communication, which is performed by attaching unprecoded training units to data packets to allow for beam corrections. For MU MIMO communication, algorithms and protocols for analog and digital beamforming training have been developed so far and defined in existing standards. However, digital and analog beam tracking for MU MIMO communications is not yet defined, and applying the algorithms developed for analog and digital beamforming training directly for multi-user beam tracking would result in large delays. One reason for this is that the existing procedures would require the interruption of the ongoing data communication to allow the STAs in the MIMO group to perform again the analog beam search, gather the channel information, perform the digital beamforming matrix computations and send the feedback information to the AP.

One of the aspects of the disclosure is to propose tracking techniques to allow for performing hybrid beamforming corrections to one or a small group of STAs within an MU MIMO group, in an efficient manner, i.e., without disrupting the transmission of the STAs, within the MU group that have good (in the sense of stable) channels. Thus, communication devices and methods for performing beamforming corrections during mmWave MU downlink MIMO transmission are disclosed.

According to an aspect of the disclosure, the goal is to perform the analog beam realignments and/or digital beamforming recomputations without disrupting the transmission to the stable STAs within the group of STAs participating in a MU transmission and without changing the beamforming configurations of the users having stable channels. This may be achieved by attaching to the downlink transmit packets one or more training units that are modulated with hybrid beamforming matrices, specially designed to create minimum interference to stable STAs. A further advantage of the disclosed solution is reduced feedback report size. The disclosed solution is thus particularly effective if one or a small number of STAs of a MU group require tracking at the same time.

In the context of the present disclosure, analog beamforming corresponds to the act of physically steering one or more directional beams into a preferred direction, e.g. by means of analog phase shifters or by changing the phase characteristics of an antenna array. Further, the complete arrays, rather than each individual element thereof, may be connected to RF chains. Finer digital beamforming can be applied in addition to the analog ones. In this manner a full MIMO capability can be obtained, in which multiple streams can be simultaneously transmitted and spatial multiplexing can be achieved. Digital beamforming corresponds to a more general concept, in which both amplitudes and phases can be controlled of each transmitted beam. After precoding (at transmitter side) and decoding (at receiver side) the beams can be separated again.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
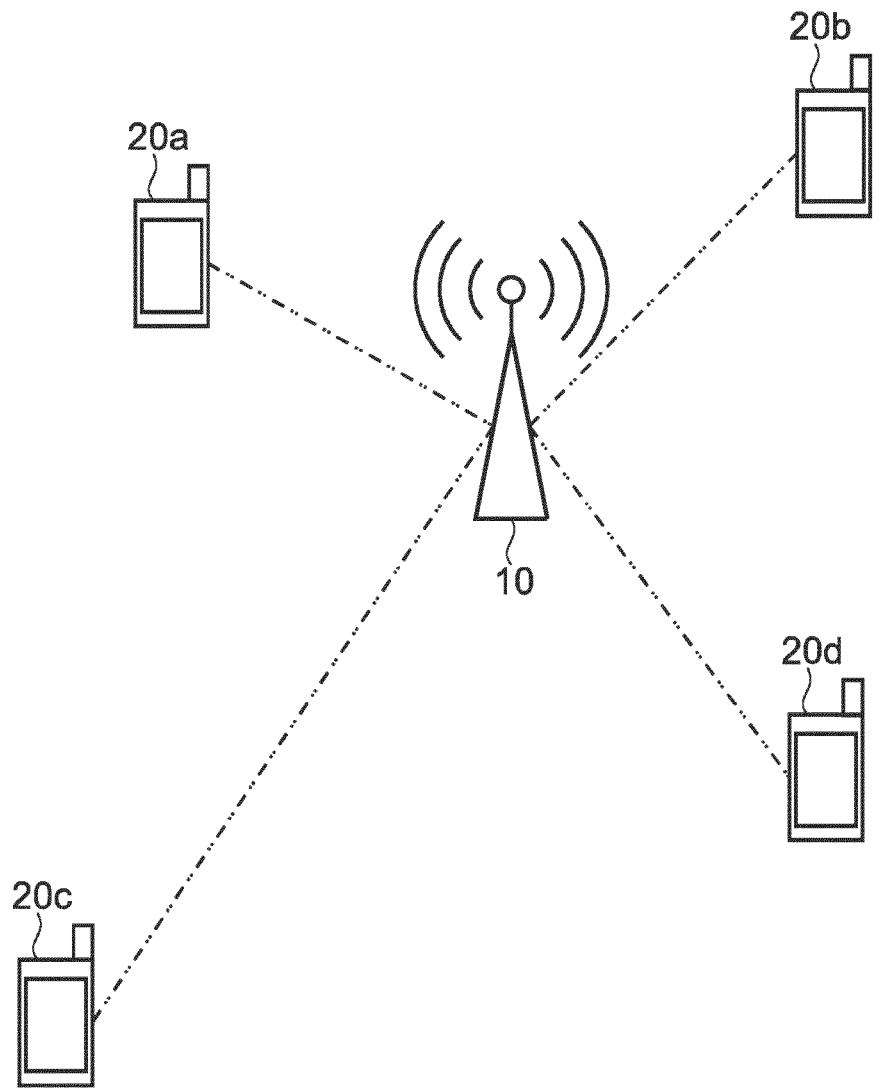
FIG. 1 shows a schematic diagram of a communication system according to the present disclosure.

Referring now to the drawings, wherein like reference numerals designate identical or corresponding parts throughout the several views, FIG. 1 shows a schematic diagram of communication system according to an embodiment of the present disclosure. The communication system is configured with a first communication device 10 and a plurality of second communication devices 20. Each of the first and second communication devices 10 and 20 has a wireless communication function. Particularly, the first communication device 10 has a multi-user communication function of transmitting frames to one or more second communication devices 20. Further, the first communication device 10 operates as an access point (AP) and the second communication devices 20 operate as a station (STA). For this reason, in the communication system, multi-user communication from the AP 10 to a plurality of STAs 20 can be performed, i.e. the first communication device 10 is able to simultaneously communicate with a group of two or more second communication devices 20 using MU-MIMO communication. Communication from the AP 10 to the STA 20 is referred to as downlink (DL) and communication from the STA 20 to the AP 10 is referred to as uplink (UL).

To enable MIMO communication, the AP 10 may be equipped with multiple antennas and multiple RF chains, allowing it to transmit multiple streams simultaneously to multiple STAs 20. Each STA 20 device may have multiple antennas and multiple RF chains to simultaneously receive multiple streams from the AP 10 or simultaneously transmit multiple streams to the AP 10.

For example, as illustrated in FIG. 1, the communication system may be configured with the AP 10 and a plurality of STAs 20a to 20d. The AP 10 and the STAs 20a to 20d are connected to each other via wireless communication and perform transmission and reception of frames directly with each other. For example, the AP 10 is a communication device conforming to IEEE 802.11 and transmits a MU DL PPDU (multi-user downlink PHY protocol data unit) having each of the STAs 20a to 20d as a destination.

Figure 2:
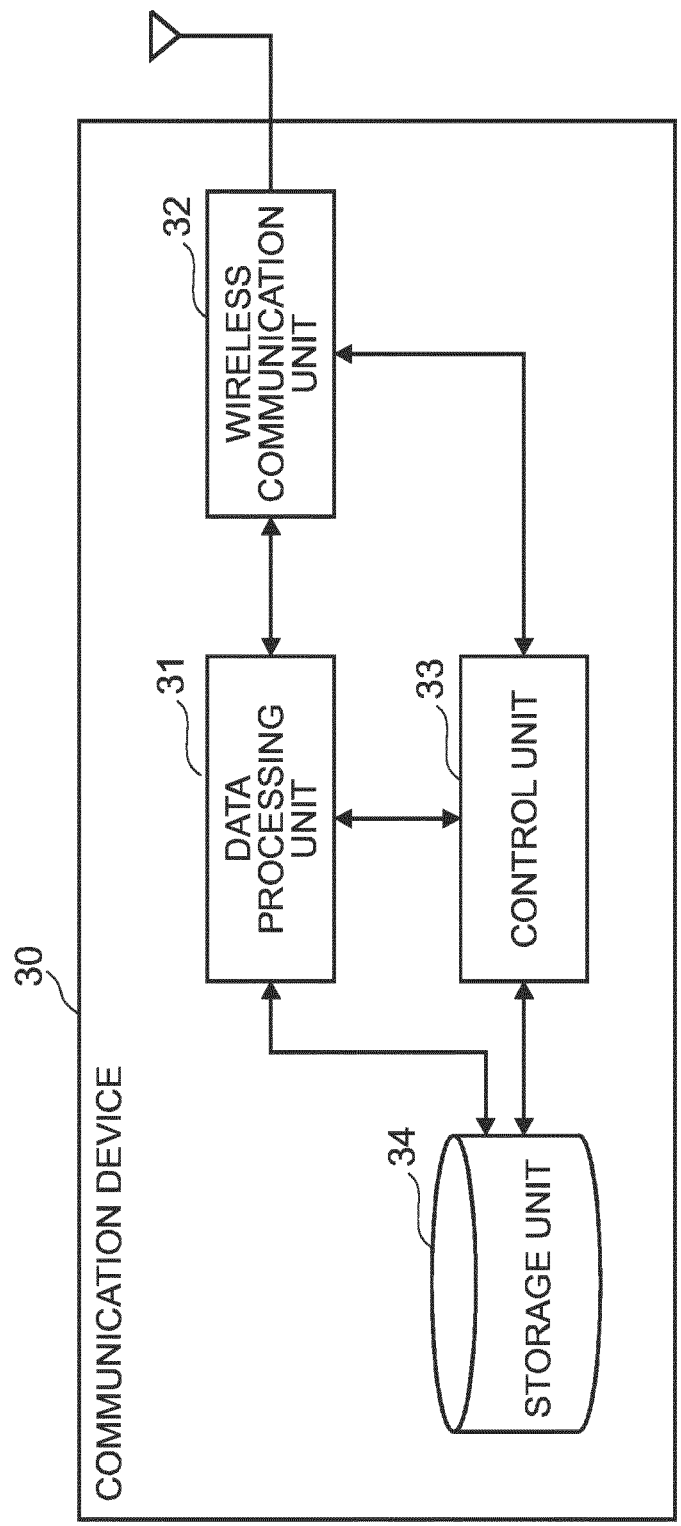
FIG. 2 shows a schematic diagram of the configuration of a first and second communication device according to an embodiment of the present disclosure.

FIG. 2 shows a schematic diagram of the configuration of a communication device 30 according to an embodiment of the present disclosure. Generally, each of the AP 10 and the STAs 20a to 20d may be configured as shown in FIG. 2 and may include a data processing unit 31, a wireless communication unit 32, a control unit 33, and a storage unit 34.

As a part of a communication device 30, the data processing unit 31 performs a process on data for transmission and reception. Specifically, the data processing unit 31 generates a frame on the basis of data from a higher layer of the communication device 30, and provides the generated frame to the wireless communication unit 32. For example, the data processing unit 31 generates a frame (in particular a MAC frame) from the data by performing processes such as fragmentation, segmentation, aggregation, addition of a MAC header for media access control (MAC), addition of an error detection code, or the like. In addition, the data processing unit 31 extracts data from the received frame, and provides the extracted data to the higher layer of the communication device 30. For example, the data processing unit 31 acquires data by analyzing a MAC header, detecting and correcting a code error, and performing a reorder process, or the like with regard to the received frame.

The wireless communication unit 32 has a signal processing function, a wireless interface function, and the like as part of a communication unit. Further, a beamforming function is provided. This unit generates and sends PHY layer packets (or, in particular for a WLAN standard, PHY layer protocol data units (PPDU)).

The signal processing function is a function of performing signal processing such as modulation on frames. Specifically, the wireless communication unit 32 performs encoding, interleaving, and modulation on the frame provided from the data processing unit 31 in accordance with a coding and modulation scheme set by the control unit 313, adds a preamble and a PHY header, and generates a PHY layer packet. Further, the wireless communication unit 32 recovers a frame by performing demodulation, decoding, and the like on the PHY layer packet obtained by a process of the wireless interface function, and provides the obtained frame to the data processing unit 31 or the control unit 33.

The wireless interface function is a function to transmit/receive a signal via one or more antennas. Specifically, the wireless communication unit 32 converts a signal related to the symbol stream obtained through the process performed by the signal processing function into an analog signal, amplifies the signal, filters the signal, and up-converts the frequency. Next, the wireless communication unit 32 transmits the processed signal via the antenna. In addition, on the signal obtained via the antenna, the wireless communication unit 32 performs a process that is opposite to the process at the time of signal transmission such as down-conversion in frequency or digital signal conversion.

The beamforming function performs analog beamforming and/or digital beamforming, including beamforming training, as will be explained below in more detail.

As a part of the communication unit, the control unit 33 (e.g., station management entity (SME)) controls entire operation of the communication device 30. Specifically, the control unit 33 performs a process such as exchange of information between functions, setting of communication parameters, or scheduling of frames (or packets) in the data processing unit 31.

The storage unit 34 stores information to be used for process to be performed by the data processing unit 31 or the control unit 33. Specifically, the storage unit 34 stores information stored in a transmission frame, information acquired from a receiving frame, information on a communication parameter, or the like.

In an alternative embodiment, the first and second communication devices, in particular each of the AP 10 and the STAs 20, may be configured by use of circuitry that implements the units shown in FIG. 2 and the functions to be carried out. The circuitry may e.g. be realized by a programmed processor. Generally, the functionalities of first and second communication devices and the units of the communication device 30 shown in FIG. 2 may be implemented in software, hardware or a mix of software and hardware.

Figure 3:
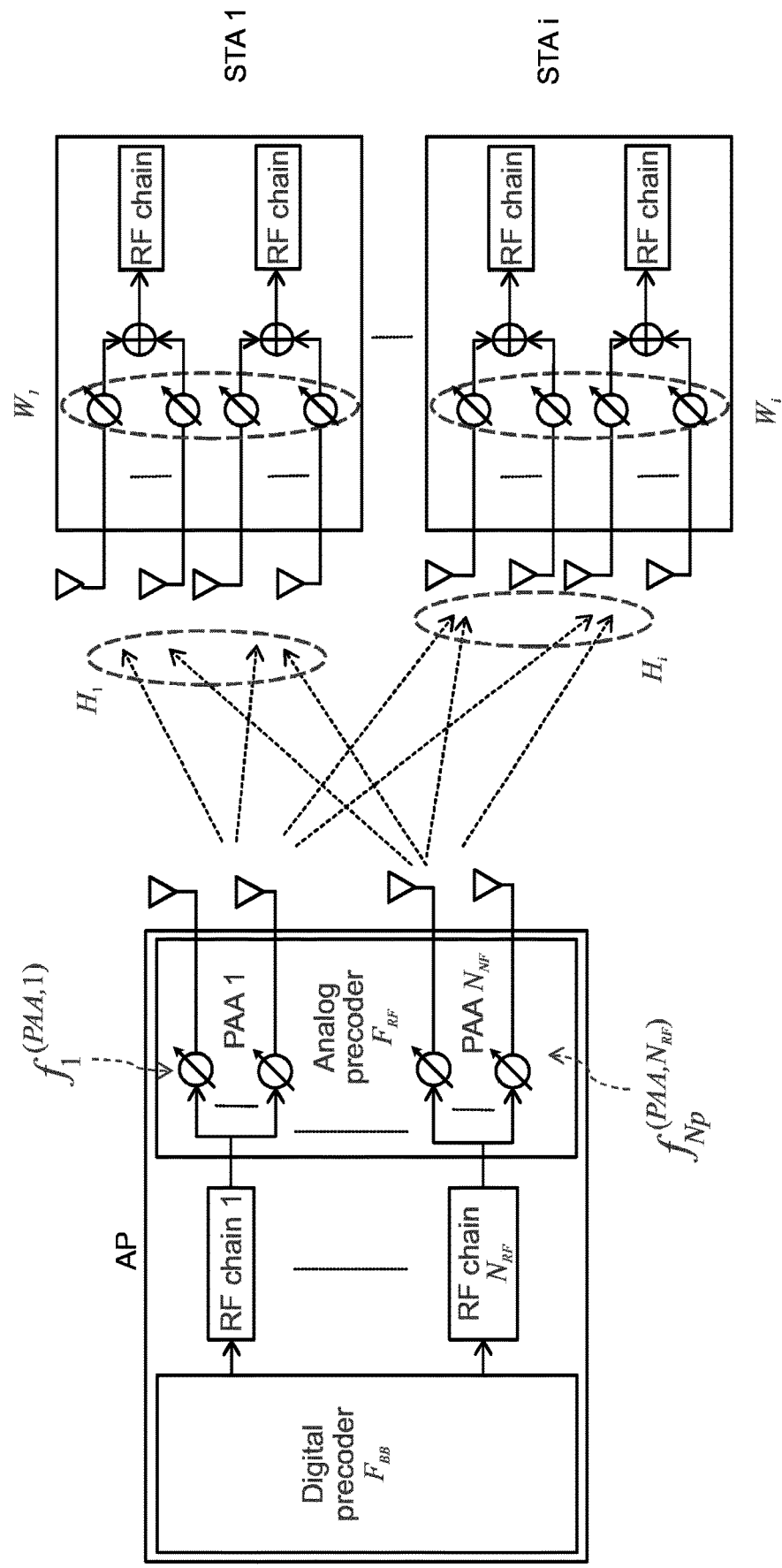
FIG. 3 shows a schematic diagram of a communication system according to an embodiment of the present disclosure.

FIG. 3 shows a schematic diagram of a communication system according to an embodiment of the present disclosure including an access point AP (comprising analog beamforming and digital beamforming circuitry or blocks) and multiple stations STA 1 to STA i (for which only the analog part is shown). Each antenna element of either AP or STA is connected to a phase shifter and multiple antenna elements are physically combined in a phased antenna array (PAA). When multiple PAAs are available, each of the PAAs is further connected to a dedicated RF chain. Each RF chain controls the phase shifter settings of the PAA it is connected to. The j-th phase setting parameter of the i-th PAA is denoted in the FIG. 3 as $f_j^{PAA_i}$ and all the phase shifter settings at the transmitter side can be abstractly represented as part of a matrix $F_{RF}$, as shown in FIG. 3. The transmission streams are mapped to the RF chains, by a digital beamforming matrix $F_{BB}$, also depicted in FIG. 3. At the receiver side, the phase shifter settings, based on which the analog receive beams are steered, are abstractly grouped in the matrices $W_i$, and further mapped to the RF chains, similar as on the transmit side.

In mathematical terms, the digital beamforming matrix, $F_{BB}$, indicating a mapping of $N_s$ streams (where, $N_s$ is the total number of streams for all STAs within an MU group) to $N_{RF}$ transmit chains takes the form $$F_{Bb} \begin{pmatrix} f_{BB,11} & \cdots & f_{BB,1N_S} \\ \vdots & \ddots & \vdots \\ f_{BB,N_{RF}1} & \cdots & f_{BB,N_{RF}N_S} \end{pmatrix} \quad (1)$$

and has dimensions $N_{RF} \times N_S$. Within an MU MIMO scenario, the $1^{st}$ N_S1 columns represent the weighting coefficients for the first to N_s1 spatial streams for the first STA. The analog beamforming matrix $F_{RF}$ can be represented as an $N_{TX} \times N_{RF}$ matrix, which can be written as $F_{RF} = [F_{RF,1} F_{RF,2} \ldots F_{RF,N_{RF}}]$, with $F_{RF,i}$, the i-th column of size equal to the total number of (sub-) antenna elements $N_{TX}$. Finally, hybrid beamformers can be represented as matrices, resulting from the multiplication of the analog beamforming matrix $F_{RF}$ and the digital beamforming matrix $F_{BB}$.

For the case depicted in FIG. 3, each column of the $F_{RF}$ matrix consists of $N_P$ unit norm elements representing the phase shifter settings of the i-th PAA if a connection to an RF chain exists and zeros otherwise. Thus, the analog precoding takes the form $$F_{RF} = \begin{bmatrix} f_1^{PAA_1} & 0 & \cdots & 0 \\ \vdots & \vdots & \ddots & \\ f_{N_P}^{PAA_1} & 0 & \cdots & \\ 0 & f_1^{PAA_2} & 0 & \vdots \\ \vdots & \vdots & \vdots & \\ \vdots & f_{N_P}^{PAA_2} & 0 & 0 \\ \vdots & 0 & \ddots & f_1^{PAA_{N_{RF}}} \\ \vdots & \vdots & \ddots & \vdots \\ 0 & 0 & 0 & f_{N_P}^{PAA_{N_{RF}}} \end{bmatrix} \quad (2)$$

$F_{RF,1}$ where $f_j^{PAA_i}$ represents the j-th phase shifter setting of the i-th PAA and $N_P$ is the total number of phase shifters of the i-th PAA. Here it has been assumed that there is the same number of phase shifters per antenna array. This is, however, only an example and the approaches are presented further on are not dependent on this.

It shall be noted that the disclosure is exemplified with partially connected arrays for simplicity, but the disclosure is not limited to this particular case and can be generalized to fully connected arrays, in which an RF chain may be connected to all sub-antenna elements.

At the receiver side, each STA applies an analog receive combining matrix, further denoted as $W_i$ for a STA i. This matrix indicates the mapping between the receive RF chains and the receive antenna elements. Wi can be seen as the receive counterpart to $F_{RF}$.

Solutions will be presented for the following cases: (i) when a transmit (TX) hybrid beamformer needs corrections, i.e., the columns of the analog beamforming matrix and the digital beamforming (DBF) matrix $F_{BB}$, corresponding to a STA need to be adapted; (ii) when a-receive (RX) analog beamformer (ABF) needs corrections, i.e., the analog combining matrix $W_i$ for STA i needs to change; and (iii) when analog beamformers are still stable, but the channel has changed beyond a certain acceptable threshold and thus the digital beamformer needs to be adapted.

Several cases will be described, namely cases where a STA requests analog beam realignment at its side (receive hybrid beam tracking), where the AP requires realignment of its analog beams to the STA (transmit hybrid beam tracking), and where only digital beam tracking is requested by the STA or AP. The type of tracking performed may be indicated by the AP in the header of a MU PPDU. Further, methods to determine the type of required beam tracking will be described. The case of analog only beam tracking at either transmit or receive side can be seen as a particular case of the hybrid beamforming training.

Depending on the type of realignment, one or more analog beamformers are used for transmission from the AP and tested at the STA (in the case of hybrid TX tracking), one or more analog beams are used for reception and tested at the STA (in case of RX tracking), or a new channel estimate is computed at the selected STA (in case of digital beam tracking). The STA or STAs that request a beamforming update procedure or are requested to perform a beamforming update procedure are referred to further on as STAs, intended STAs or selected STAs. The STAs which are part of the MU group, but are not specifically addressed to perform beamforming updates are further referred to as non-selected or non-tracked STAs.

To transmit to multiple STAs simultaneously, an MU downlink (DL) PHY protocol data unit (PPDU) can be sent as follows: The first part, which consists of legacy elements (legacy preambles and headers), is modulated with an analog beamforming matrix and a first column of a digital beamforming matrix and sent sequentially over the involved RF chains. The second part of the MU PPDU is sent with a hybrid beamforming matrix, which consists of the analog beamforming matrix for all antennas and digital beamforming matrix $F_{BB}$. The latter digital beamforming matrix has been obtained after a previous sounding (i.e. training) stage, which has been performed after the analog beam training or after a jointly analog-digital beamforming training. After the MU PPDU transmission, each STA sends UL single user (SU) PPDUs successively, e.g., acknowledgements according to the reception status of the MU PPDU, as replies to individual polls or triggers or to a schedule included in the initial MU PPDU.

To allow for low effort beam-tracking, one disclosed solution involves attaching training units (TRN) to an MU DL PPDU, which are transmitted with an analog beamforming matrix. Since this matrix may be specifically adapted for the tracking of the selected STA, depending on the type of realignment required, it may differ from the analog beamforming matrix used in the transmission of the MU DL PPDU. Therefore, this matrix is further referred to as analog beamforming training matrix. Furthermore, for cases in which the analog beamforming separation is not enough, in addition to the analog beamforming matrix, a digital beamforming matrix (also called digital beamforming training matrix herein) may be applied, which serves for dimensionality reduction of the tracking operations at the intended STAs and most importantly for maintaining low to no interference to the rest of the STAs in the MU group. Since the digital beamforming matrix applied on the training units is specifically used for tracking, as discussed above, depending on the type of realignment required, it may differ from the digital beamforming matrix used in the transmission of the MU DL PPDU, for which reason this matrix is further referred to as digital beamforming training matrix. Since only one or a limited number of STAs can perform tracking simultaneously by this technique, the AP should include within the MU PPDU with the TRNs an indication of the one or more STAs which should realign their analog, digital or hybrid beam based on the appended training units or which should compute and send feedback for the appended training units.

The effective channel impulse response (this is the channel between transmitter and receiver for a particular beamforming setting) is estimated based on the TRNs by the intended STA (meaning the STA that has requested beam tracking or that has been requested by the AP to perform beam tracking; also called selected STA or targeted STA herein), which may further use this estimate to compute a singular value decomposition. Based on this, a second part of the digital beamforming matrix (also called digital beamforming feedback matrix herein) may be computed, which will be fed back to the AP. Thus, the final corrected hybrid beamforming matrix to be used by the AP for the intended STA is a combination of the digital beamforming training matrix used by the AP during the transmission of the TRNs and a beamforming matrix (the digital beamforming feedback matrix) computed by the STA, after decomposing the effective channel matrix, i.e., the channel matrix estimated after applying the analog transmit and receive beams and the transmit digital beamforming training matrix.

In other words, at the end of a tracking round for the i-th STA, the new digital beamforming matrix for this STA is a function of the digital beamforming training matrix computed at the transmitter based on the channels of the stable STAs and a second matrix computed at the STA based on the digital beamforming training matrix and one or more analog beamforming combinations and reported back to the AP. The rest of the digital beamformers are left unchanged.

The digital and analog beamformers for the STAs which were not targeted by the tracking round remain unchanged, i.e., the columns of the $F_{RF}$ matrix, consisting of phase shifters mostly directed to $STA_j$, j≠i and the columns of the $F_{BB}$ matrix corresponding to the streams of $STA_j$, j≠i. Depending on the type of realignment required, means to efficiently compute the digital beamformers for the training units are disclosed herein.

Finally, an alternative approach to efficiently obtain channel estimates at the AP is proposed, in which STAs facilitate a reciprocity based estimation at the AP during the acknowledgment phase.

In the context of the present disclosure the digital beamforming training matrix shall be understood as a digital beamforming matrix that is applied by the first communication device (AP) on each of the training units, corresponding to one MIMO analog beamforming configuration. One of the design criteria, as proposed and disclosed herein, is to minimize or null the interference that is experienced by the stable second communication devices (STAs), after the analog beamforming matrix is applied. The digital beamforming training matrix depends on the analog beamforming matrix applied on the specific MIMO training units.

The digital beamforming feedback matrix shall be understood as a digital beamforming matrix that is computed by the STA with the goal to have best reception for the streams that are intended for itself. It depends on the analog beamforming combination utilized at both transmit and receive side (i.e. by the AP and STA), the applied digital beamforming training matrix and the estimated channel. Unlike the digital beamforming training matrix, it only depends on the channel knowledge at the STA that is computing this, i.e., the channel knowledge between AP and STA and not on knowledge of channel information from/to other STAs in the group. It may have a lower dimension than the digital beamforming training matrix.

The updated digital beamforming matrix (also called "complete" or "final" digital beamforming matrix) shall be understood as the digital beamforming matrix that will be used by the AP for the transmission of the data (PHY layer) packets following a successful beam tracking procedure, as disclosed herein. It is formed by the digital beamforming matrix that was used for the transmission of the data packet in which the submatrix corresponding to the selected STA is updated as follows. The submatrix corresponding to the selected STA(s) is computed as a multiplication of the digital beamforming training matrix with the digital beamforming feedback matrix, reconstructed from the feedback sent by the selected STA.

Whenever the term beamformer is used in this disclosure, it is to represent a beamforming matrix or the physical effect of applying a beamforming matrix. Herein, the terminology "analog beamforming matrix" is used to express a set of analog phase shifter settings applied to steer radiation beams towards desired directions, and the terminology "digital beamforming matrix" is used to express the set of complex weights corresponding to mapping between the symbol streams and the RF chains.

In the following a first case called hybrid TX beam tracking will be described, in which STA movements or channel fluctuations require updating the analog and digital beamforming configuration at the AP (at TX).

In order to have a feasible solution in this case, the AP should have gained CSI information from all STAs for the beams to be tested before the MU DL transmission. This information can be gathered during the beamforming training and sounding periods that precede the beam tracking.

Figure 4:
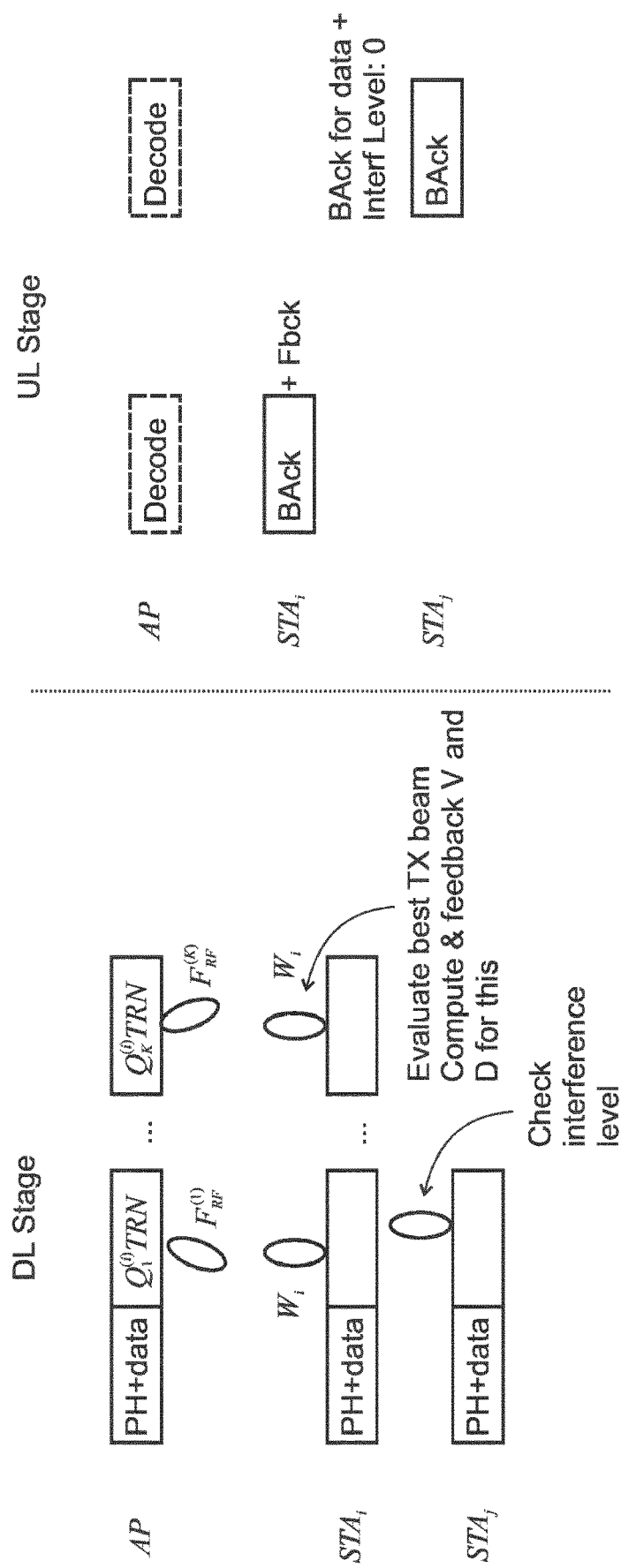
FIG. 4 shows a diagram illustrating the downlink stage and the uplink stage of an embodiment of TX hybrid beam tracking according to the present disclosure.

A first proposed tracking procedure is depicted in FIG. 4 showing a diagram illustrating the downlink (DL) stage and the uplink (UL) stage of TX hybrid beam tracking according to the present disclosure. In FIG. 4 and the following equations and description it is assumed that $STA_i$ is the one for which beam corrections were requested or presumed, while the rest of the STAs in the group $STA_j$, $j \neq i$ have stable channels. For ease of exposition, it is assumed that STAs are indexed such that $STA_i$ has the largest index. As depicted, the AP attaches K TRN units (or groups of two or more TRN units) to the MU DL packets, where each TRN unit or group of two or more TRN units is sent with one analog beamforming matrix (i.e., analog beamforming training matrix) by changing the phase shifters corresponding to the PAAs mostly associated with $STA_i$ (i.e., beams from the RF chains for which the i-th $STA_i$ has indicated a good reception, during the beam training phase), while the rest of the $F_{RF}$ matrix will stay the same. Before transmission, each of the TRN units is first shaped by the digital beamforming training matrix Q, which depends on the analog beamforming training matrix that will be applied on said particular TRN unit and whose construction will be discussed below. The STA performing tracking uses a fixed receive analog beam matrix $W_i$ to receive each of the training units or groups of TRN units and computes the feedback. Each of the non-selected STAs of the MU group uses a fixed analog receive beam matrix and evaluates an interference metric.

Figure 5:
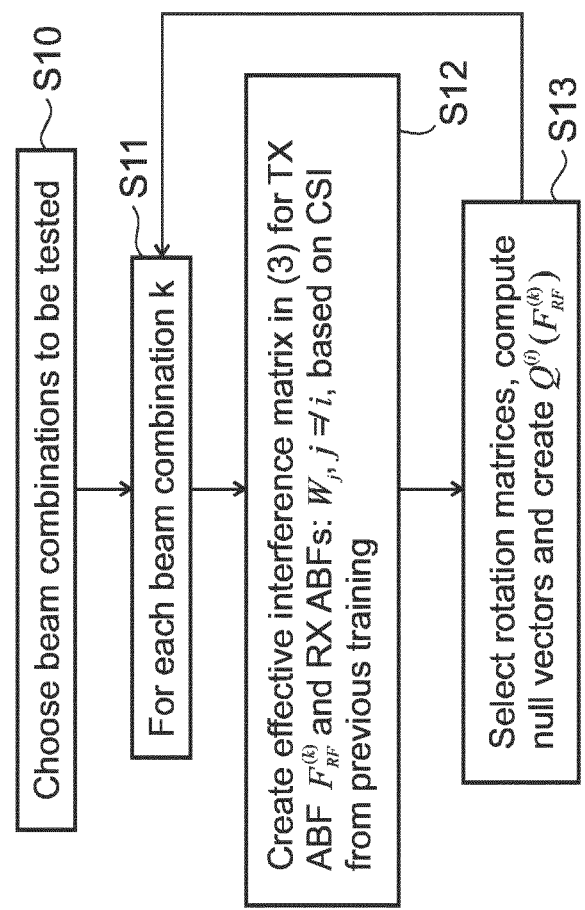
FIG. 5 shows a flowchart illustrating the operation at the AP in the embodiment of TX hybrid beam tracking shown in FIG. 4.

Before transmission of a tracking PPDU, the AP must decide upon the analog and compute the corresponding digital beamforming training matrices that will be used in the tracking procedure. The process required for this determination is illustrated in the flowchart shown in FIG. 5. In order to perform beam tracking in this case, K transmit beamforming training matrices denoted as $F_{RF}^{(k)}$, with index k between 1 and K, are tested (step S10) Since mostly the phase shifter settings corresponding to the PAAs radiating towards the tracked STA will be modified during the actual transmission, the analog beamforming matrix for the k-th analog beamforming matrix denoted by $F_{RF}^{(k)}$ has modified columns according to these analog beams (mostly steered towards $STA_i$), whereas the rest of the columns are left unchanged (i.e., with respect to the analog beamforming matrix used in sending the MU PPDU).

For each of the K tested analog beam combinations (step S11), a matrix containing the analog beamformed channels for the STAs which are not targeted by the current beam tracking operation is constructed (step S12):

$$\widetilde{H}_t F_{RF}^{(k)} = \begin{pmatrix} W_1 H_1 F_{RF,1}^{(k)} & \cdots & W_1 H_1 F_{RF,N}^{(k)} \\ \vdots & \ddots & \vdots \\ W_{i-1} H_{i-1} F_{RF,1}^{(k)} & \cdots & W_{i-1} H_{i-1} F_{RF,N}^{(k)} \end{pmatrix} \quad (3)$$

where $H_j$ is the channel from each antenna element of the AP to each antenna element of the $STA_j$, and $W_j H_j F_{RF,p}^{(k)}$ represents the effective channel between the p-th PAA at the AP and $STA_j$ after applying receive analog beamforming matrix $W_j$ and the transmit analog beamforming training matrix $F_{RF}$. For OFDM the matrix in (3) is in the frequency domain, defined per subcarrier, or per group of subcarriers with averaged channel, and in the case of single carrier is defined in the time domain with averaged channels or best taps.

In a next step (step S13), the matrix defined in equation (3) is decomposed by a matrix decomposition rule which separates the null space. Further, $L_S$ vectors in that null space of the effective interfered matrix in (3) are chosen, where $L_S$ is at least equal to the number of spatial streams of the i-th STA. These vectors can be obtained by performing a matrix decomposition, e.g. by using Givens rotations. This is because it is known that the matrix in (3) can be equivalently written as $$\widetilde{H}_t F_{RF}^{(k)} = \begin{bmatrix} r_{11} & 0 & \cdots & 0 & 0 & \cdots & 0 \\ \cdots & r_{22} & \ddots & \vdots & \vdots & \ddots & \vdots \\ r_{N_r,1} & r_{N_r,2} & \cdots & r_{N_r,N_{t'}} & 0 & \cdots & 0 \end{bmatrix} \begin{bmatrix} q_1^{(i),H} \\ \vdots \\ q_N^{(i),H} \end{bmatrix} \quad (4)$$

with $S_i$ denoting the set of the indices of the columns corresponding to nulls, with $r_{i,j}$ complex values and $q_1, \ldots q_N$, unitary norm vectors.

Only a small subset of the columns of the matrix in equation (3) are modified for each beam combination, (i.e., only the columns corresponding to the analog beam combination tested during one training unit) while a large part of the matrix in (3) is actually unchanged from previous training or tracking rounds. Thus, a large number of Givens rotation matrices can be reused, to obtain the necessary vectors in the null space of the compound channel matrix (3).

In an embodiment it may not be necessary to perform a complete decomposition as in (4), but only appropriately choose the required number of columns to be nulled, which e.g. correspond to angles pointing most to the STA requiring tracking.

Figure 6:
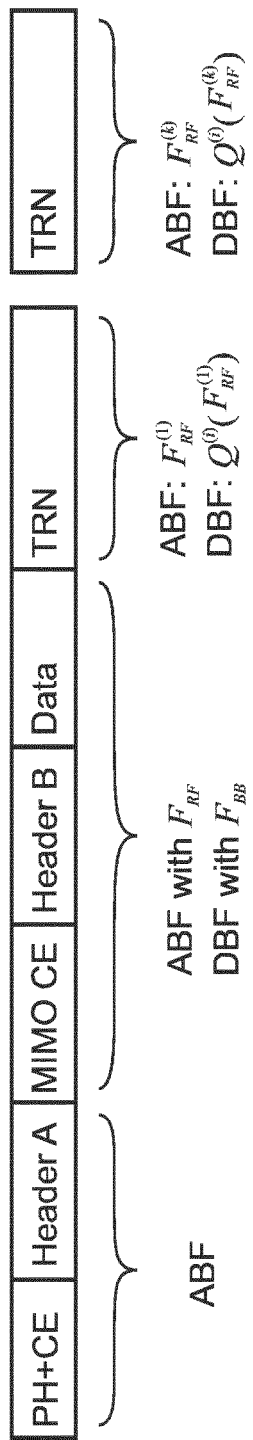
FIG. 6 shows the format of a transmit packet (MU PPDU) with attached training units used in the embodiment of TX hybrid beam tracking shown in FIG. 4.

After obtaining the one or more vectors in the null space, $q_l$, $l \in S_i$, these are grouped in a matrix $Q^{(i)}(F_{RF}^{(k)}) = [q_1, \ldots, q_{L_s}]$, which is further used to precode the $k^{th}$ MIMO training field appended at the end of the MU PPDU. The final format of the MU PPDU with the attached TRNs is shown in FIG. 6 depicting the analog beamforming (ABF) and digital beamforming (DBF) matrices used to send the PPDU during the beam tracking procedure described in FIG. 4, i.e., the different analog and digital beamforming configurations used for the different parts of the MU PPDU are emphasized.

The number of columns $L_S$, of each of the digital beamforming matrices $Q^i(F_{RF}^{(k)})$ can be chosen as equal to the number of streams that the i-th STA supports, or larger but not exceeding the number of receive RF chains at this STA.

In many operations, choosing $L_S=N_S$ is expected to be enough. However, the larger the Ls, the better the final digital precoder will be, as more information from the null space is available and thus matrices better suited to the i-th STA channel can be chosen.

Figure 7:
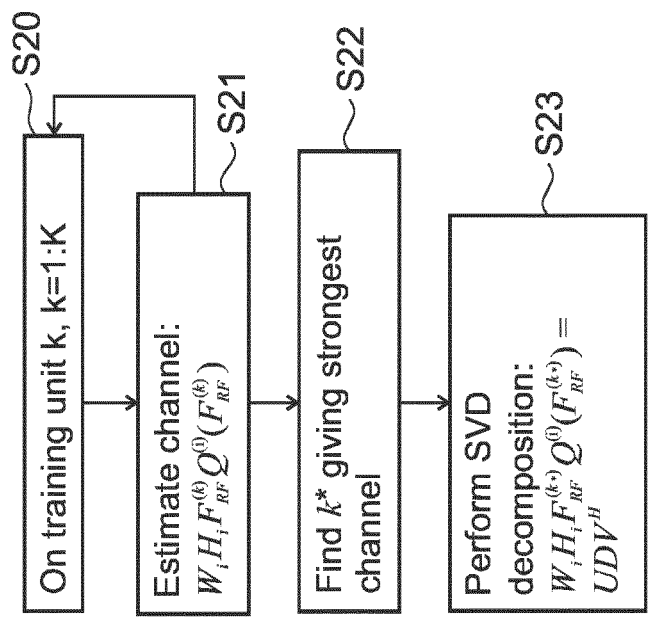
FIG. 7 shows a flowchart illustrating the operation at the receiving STA in the embodiment of TX hybrid beam tracking shown in FIG. 4.

The operation at the receiving tracked STA is illustrated in the flowchart shown in FIG. 7. As depicted in FIG. 4, the receiving STA keeps its analog beam fixed during the reception of each digitally beamformed MIMO TRN unit (step S20) and estimates, on each of the training units (or group of training units), the effective channel, depending on the beamforming matrices applied at both transmit (analog and/or digital beamforming training matrices) and at the receive side $W_i$ (step S21). Furthermore, it evaluates a measure of signal strength (RSSI or Signal to Noise Ratio (SNR)) and determines the training unit for which this value was the best (Step S22). For the training unit for which the strongest value has been obtained, the channel estimate performed in Step S21, is used to perform a singular value decomposition (SVD) (step S23), based on which the digital beamforming feedback matrix, which is denoted as V and the corresponding diagonal matrix D containing powers or SNR levels are computed.

The i-th STA then feeds back the index of the TRN, for which the best metric was obtained, the matrix V and corresponding powers in D, e.g., attached to the next BAck frame or UL frame. The format of the fed back matrix can be uncompressed i.e., per line and columns, or compressed e.g., by means of Givens rotations, in which case angles and powers are reported, or by means of similarity to some beamforming codebook entries, in which case indexes are reported. The information on the strongest received training unit will be fed back to the AP, in order to allow the latter to determine an updated analog beamforming matrix. Specifically the analog beamforming matrix used in the transmission of the packet will be updated such that the analog beamforming submatrix corresponding to the tracked STA, will be changed based on the analog beamforming setting used in the training unit received with strongest power.

For example, assuming the last two PAAs were steered towards $STA_i$, only the last two columns of the matrix $F_{RF}^{(k)}$ are changing on each of the training units. The optimum analog phase shifters i.e, the ones applied on the training unit received best by the selected STA are then captured in the last two columns of the analog beamforming matrix and can be denoted as $F_{RF,N-1}^{(k^*)}$ and $F_{RF,N}^{(k^*)}$. In the updated analog beamforming matrix, which will be used for the following MU packets, the last two columns are updated whereas the rest of the columns of F_RF are the same as the ones used in the transmission of the packet, as shown in equation (6).

Finally, the digital beamforming matrix $F_{BB}$, that will be used by the AP in the transmission of the next MU PPDU, will be updated, in the sense that the columns corresponding to the streams of i-th STA will be replaced by the newly computed matrix $Q^{(i)}(F^*_{RF})V$ and will be used in the following null space computations, should tracking be required again, within the TXOP time or before the next training. The updated beamforming matrices then have the following format:

$$F_{BB}=[F_{BB,1},F_{BB,2},\ldots,F_{BB,i-1},Q^{(i)}VD] \quad (5)$$

$$F_{RF}=[F_{RF,1},F_{RF,2},\ldots,F_{RF,N-1}^{(k^*)},F_{RF,N}^{(k^*)}] \quad (6)$$

The operation at the non-selected STAs i.e., the STAs which did not request and were not instructed to performing tracking, however are part of the MU group, is as follows.

During each of the training units, these maintain the analog receive beam used for the reception of the data part of the packet and evaluate a measure of the received signal strength or interference. By choosing the initial digital beamformers in the null space of the beamformed channels of the STAs, under ideal circumstances interference towards these STAs should be zero. However, due to imperfections in channel information or due to erroneous estimation or changes in the channels, interference may occur. Therefore, these STAs should also have the opportunity to indicate if the experienced interference levels for any of the digital beamforming training matrices or analog beamforming training matrices used during the tracking procedure is larger than a given threshold. If the interference is larger than a threshold, the affected STA should indicate the index of the MIMO TRN on which the threshold was exceeded, and, optionally, the level of the received interference or interference plus noise or estimated SINR.

Based on this information, the AP may decide to keep the corrected hybrid beamforming matrix for the i-th STA and update the $F_{RF}$ and $F_{BB}$ matrices accordingly for the next PPDU transmission, or request a new tracking for the i-th STA, or perform some type of scheduling if interference too large (e.g., not serve i-th STA).

So far, it has been considered that the Q matrix has $N_{RF}$ lines and $L_S$ columns, thus smaller than the preceeding $F_{BB}$ matrix. Alternatively, it is possible to design a similar tracking scheme where the DBF used in sending the TRNs is of the same dimension as the $F_{BB}$, used for the data part of the PPDU. This can be done by reusing the columns of the $F_{BB}$ matrix corresponding to the streams of the users having stable links (users j≠i) and replacing the columns corresponding to the i-th user by the matrix $Q^{(i)}(F_{RF}^{(k)})$. In the latter case, the operation at the STAs not targeted by the tracking round (j≠i) can be slightly modified, e.g., these can estimate only the interference (by looking at the estimation sequences of the user to be tracked), or estimate signal to interference plus noise (SINR) or a function of the SINR.

Figure 8:
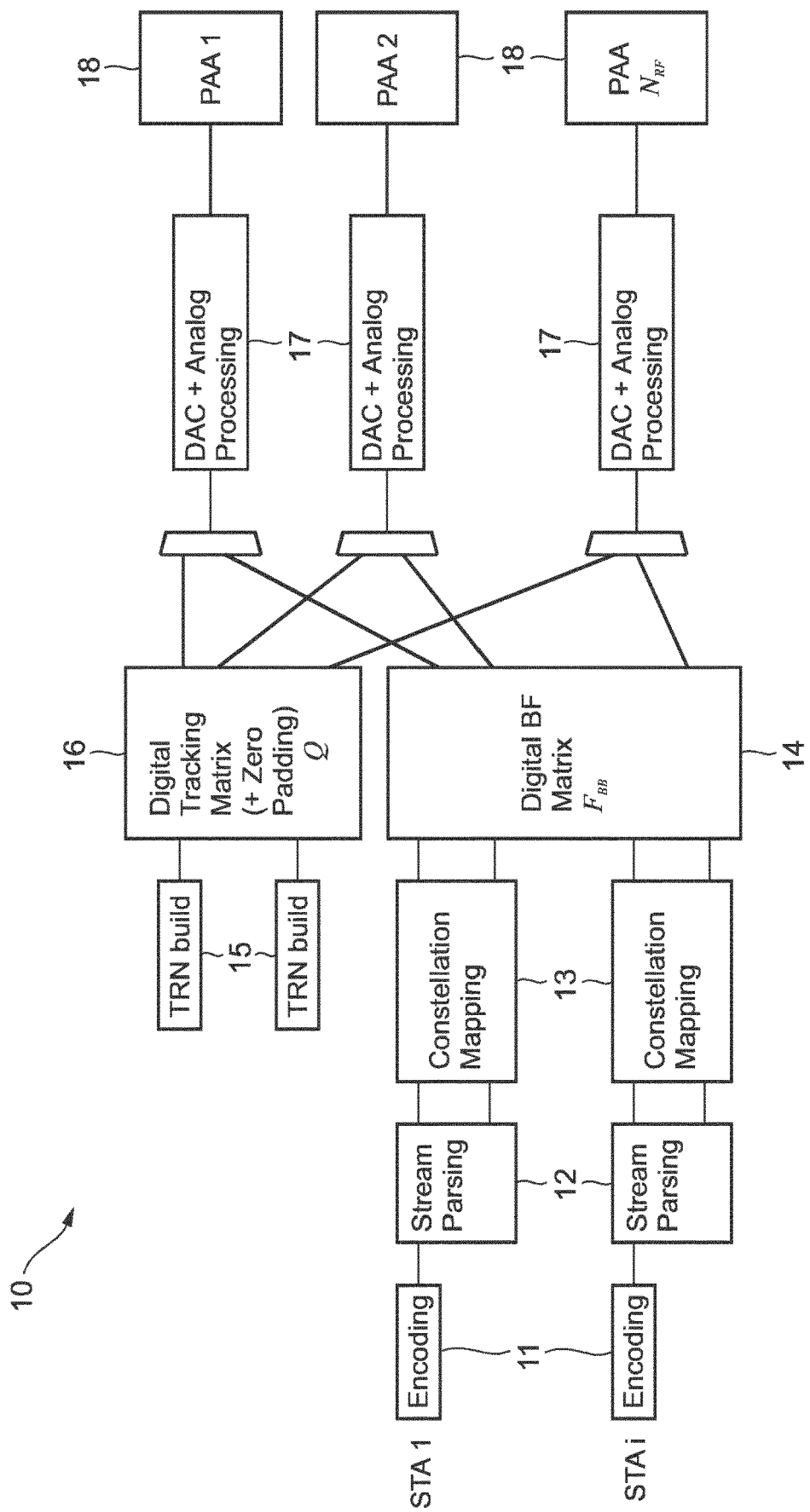
FIG. 8 shows a schematic diagram of an embodiment of an AP according to the present disclosure.

FIG. 8 shows a schematic diagram of an embodiment of a first communication device 10 (i.e., an AP) according to the present disclosure. Like a conventional AP, it comprises, per station, an encoder 11, a stream parser 12 and a constellation mapper 13 for processing the data to be transmitted to the different STAs. The processed data streams for the different STAs are then precoded by a common digital beamformer 14 using the digital beamforming matrix $F_{BB}$. In addition, TRN builders 15 are provided for building the training units, which, differently from a conventional AP, are then precoded by a digital training beamformer 16 using the digital beamforming training matrix Q. The output of the digital beamformer 14 and the digital training beamformer 16 is then processed on various RF chains by DAC (digital to analog converters) and analog processing units 17 (including steering with an analog beamformer) before the obtained RF data streams are output by the $N_{RF}$ PAAs 18.

For the case of analog TX beam tracking, the operation depicted in FIG. 4 is simplified as follows: at the AP side on each of the training units or group of training units, k=1 . . . K, only the analog beamforming training matrix $F_{RF}^{(k)}$ is applied, without further precoding with the digital beamforming training matrix Q. Deciding on the analog beamforming matrices, to be used by the AP, can be done similarly as for the hybrid TX case e.g., to minimize the elements of the matrices in (3) and increase the chances of improved reception at the selected STA, assuming some a-priori knowledge (position, change in position, previous training information). The selected STA maintains the analog receive beam, used for the reception of the rest of the packet, and evaluates a measure of the signal strength. Since no digital beamforming is required, it is not necessary to perform a full channel estimation a channel decomposition and computation of the digital beamforming feedback matrices (S23 in FIG. 7). The feedback in this case only consists of the index of the TRN, on which the evaluated reception metric gave the best result. Based on this, the AP updates the phase shifter settings, according to the ones used for the transmission of the indicated TRNs (as shown in Eq. 6).

In the following a second case called hybrid RX beam tracking will be described, in which STA movement or change of channel requires realignment at the STA (at RX). When analog receive beam tracking at STA side is to be performed, the operation is similar to first case described above, however with some simplifications.

Figure 9:
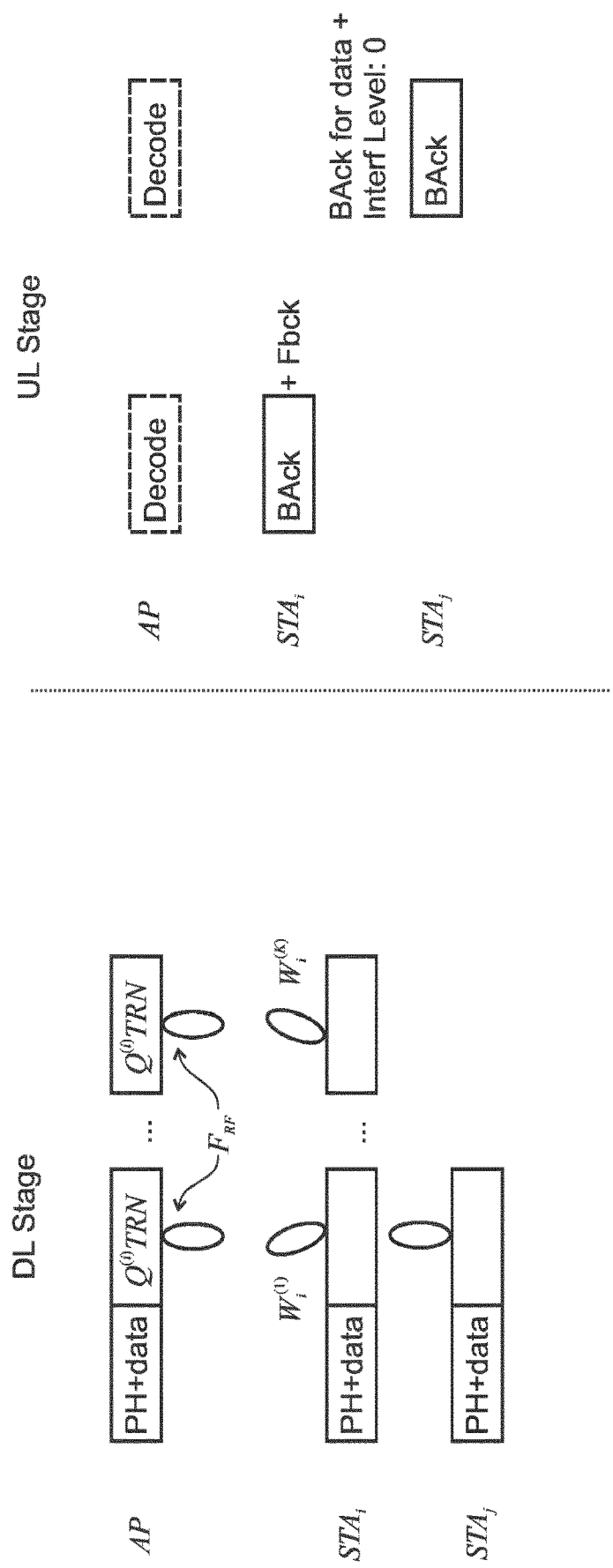
FIG. 9 shows a diagram illustrating the downlink stage and the uplink stage of an embodiment of RX hybrid beam tracking according to the present disclosure.

In this case, at the transmitter side, the operation is shown in FIG. 9. Similar to the hybrid TX beam tracking case, the AP attaches to the MU DL packet, K training units, and on each of them it applies one analog beamforming training matrix. As a simplification to the previous case, for hybrid RX beam tracking, it is sufficient for the AP to reuse the analog beamforming matrix applied in the transmission of the MU DL packet for the selected STA, also as an analog beamforming training matrix, applied on each of the K TRN units or group of TRN units. The repetition of the analog beamforming training matrix is necessary to allow the receiver side to change its analog beamforming configuration and measure the channel. The digital beamforming training matrix $Q^{(i)}$ can be computed as in the hybrid TX beam tracking case by finding a matrix in the null space of (3). However, in this case, recomputing vectors from the null space to form the $Q^{(i)}$ matrix may also not be necessary as the digital beamforming matrices already used for the transmission of the MU DL packet, particularly for $STA_i$ are actually part of the null space of (3). However, if some a priori knowledge, e.g. in terms of moving direction of $STA_i$ is available at the AP, this can be used to improve the choice of the $Q^{(i)}$ matrix (e.g., multiplication with rotation matrices maintains the null space property and may improve performance). The operation is depicted in FIG. 9 showing a diagram illustrating the downlink stage and the uplink stage of an embodiment of RX hybrid beam tracking according to the present disclosure. A flowchart illustrating the operation at the STA in the embodiment of RX hybrid beam tracking shown in FIG. 9 is depicted in FIG. 10.

At the receiver side of the selected STA, on each of the MIMO TRN units (step S30) one receive beam is tested and a measure of signal strength is evaluated (RSSI or Signal to Noise Ratio (SNR)) and a channel estimation is performed (step S31). The receive analog beam $W^*_i$, for which the strongest measure has been obtained, will be further used. For the effective channel (step S32) depending on this analog beam, (i.e., $W^*_i H_i F_{RF} Q^{(i)}$, an SVD decomposition is performed (step S33) to compute the digital beamforming training matrix to be used for the selected STA: $W^*_i H_i F_{RF} Q^{(i)} = UDV^H$, where U and V are unitary matrices corresponding to the second receive and transmit beamforming matrices respectively and D is a diagonal matrix containing on its main diagonal values SNR values that would be achieved by the potential streams. The STA then transforms the digital beamforming feedback matrix to the desired format e.g., set of angles resulting from repeated application of Givens rotation matrices or real and imaginary parts corresponding un uncompressed entries in these matrices. Finally it feeds back the matrix V and corresponding powers in D, e.g., attached to the next BAck frame or some other UL frame.

Figure 10:
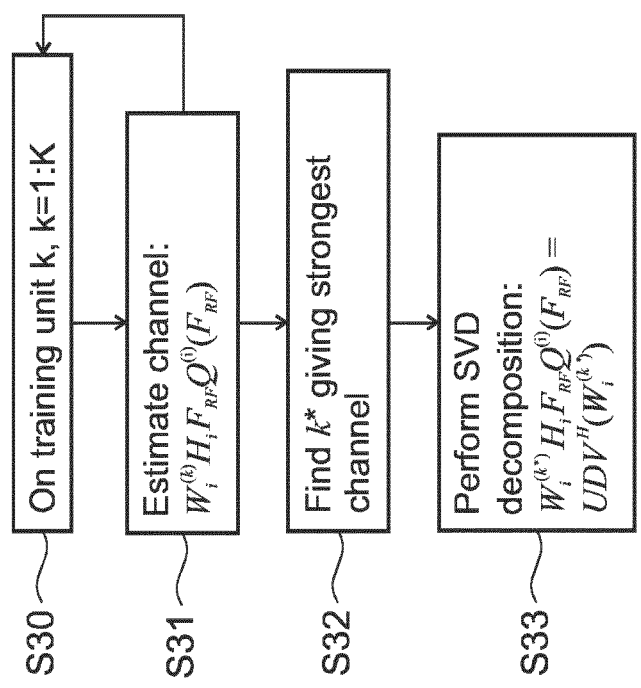
FIG. 10 shows a flowchart illustrating the operation at the STA in the embodiment of RX hybrid beam tracking shown in FIG. 9.

For the case of analog RX beam tracking, the operation is similar to that depicted in FIGS. 9 and 10, with the following simplification. At AP side, the AP applies on each of the k training units the same analog beamforming matrix used in the transmission of the data part of the packet, without a digital beamforming matrix Q applied. At the selected receiver side, on each of the training units or group of training units k, the STA changes the receive analog beam and, evaluates, in step S31, only a measure of the received signal strength, not the complete channel estimate. Further, step S33 is not necessary, as no digital beamforming matrix will be further applied. In this case the operation can even work without feedback to the transmitter or the feedback can be a simple acknowledgement. However, due to the MU transmission being prone to interference, which can only be managed by the PA based on accurate channel knowledge towards all the STAs in the group, it is in general beneficial to send updated channel information to the AP after the receive beam change.

The digital beamforming matrix that will be used by the AP in the transmission of the next DL PPDU will also be updated, in the sense that the columns corresponding to the i-th STA will be replaced by the newly computed matrix $Q^{(i)}V$. This will also be used in the following null space computations, should tracking be required again, within the TXOP time i.e., before the next training. The rest of the columns of the $F_{BB}$ matrix are left unchanged. then have the following format:

$$F_{BB}=[F_{BB,1},F_{BB,2},\ldots,F_{BB,i},Q^{(i)}V(W_i^{(k*)})D] \quad (7)$$

$$F_{RF}=[F_{RF,1},F_{RF,2},\ldots,F_{RF,i}] \quad (8)$$

$$\text{with } W_i = W_i^{(k*)} \quad (9)$$

The $V(W_i^{(k*)})$ shows the dependency of the computed digital beamforming feedback matrix on the applied receive analog beamforming matrix for which best reception of a TRN unit was obtained.

Figure 11:
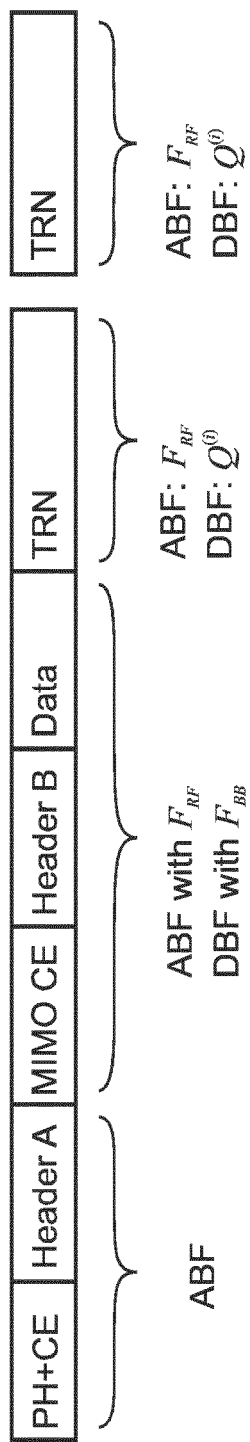
FIG. 11 shows the format of a transmit packet (MU PPDU) with attached training units used in the embodiment of RX hybrid beam tracking shown in FIG. 9.

The analog and digital beamformers used in the transmission of the PPDU for tracking mode are shown in FIG. 11 depicting the analog BF (ABF) and Digital BF (DBF) matrices used to send the PPDU during the tracking procedure described in FIG. 9.

By performing the initial digital beamforming of the TRNs with vectors from the null space of $H_i F_{RF}$, the dimension of the channels to be estimated is reduced from $N_{RX} \times N_{RF}$ to $N_{RX} \times L_S$ and the feedback from $N_{RF} \times L_S \times N_f$ to $(L_S) \times N_S \times N_f$, where $N_f$ represents the number of subcarriers or subcarrier groups.

Once the Q matrices are available, an alternative transmission scheme to the ones presented in FIGS. 6 and 11, is to introduce analog only beamformed MIMO TRN unit or reuse the ABF and DBF settings used during the transmission of the preamble, on one or more training units, before the TRNs specifically used for the tracking procedure, or before each TRN unit or group of TRN units used for tracking and for which a new ABF and DBF setting is tested. This is to simplify the effective channel estimates by providing a clean reference for these.

In the following a third case will be described, in which only digital beamforming tracking is necessary. If $STA_i$ only needs to perform digital BF tracking, only one MIMO TRN unit may suffice, as the analog beamforming configuration is maintained at both transmit and receive side. In this case, the analog beamforming training matrix applied on the MIMO training unit or group of training units is the same as the one used for the transmission of the data part of the MU DL packet, as in this case only a re-estimation of the channel may be necessary. At the receiver side, the selected STA maintains the same receive analog beam used for the reception of the MU DL packet, estimates the channel and sends back a digital beamforming feedback matrix to allow the AP to determine the updated digital beamforming matrix to be used in the next MU DL packet transmission, as described in the hybrid TX beam tracking case.

If multiple STAs have to perform the tracking simultaneously, the initial digital beamforming matrix is extended to include null vectors for all these STAs e.g., if $STA_i$ and $STA_k$ have to perform tracking simultaneously, the matrix in (3) is constructed for all matrices excluding i and k, and $L_s$ null vectors are chosen, with Ls larger or equal than the total number of streams at $STA_i$ and $STA_k$ to construct the Q matrix. However, in this case the AP may need to perform an additional diagonalization to remove possible interference between the 2 STAs i and k. The Q matrix only protects the STAs other than i and k from interference.

For OFDM operation the matrix in (3) as well as the decomposition in (4) is preferably created and respectively computed for each frequency subcarrier or group of subcarriers. The training sequences are in this case transmitted in OFDM mode, and thus the estimation of the effective channel matrix can be performed per subcarrier.

It can be noted that, when the STAs are well spatially separated, columns within the matrix in (3) can be naturally very small or close to null. In this particular case the $q_i$ vectors can be simply chosen as columns of the identity matrix, which equivalently reduces to a non-precoded transmission of the TRN fields.

For all three cases described above, where the digital beamforming matrices were involved, when only Q matrices are used as digital beamforming training matrices (i.e. digital beamforming training matrices) for the training units, there is a sudden change in the number of transmitted streams (from the data packet to the training units). However, the MIMO TRNs have to be chosen such that the intended STA as well as the rest of the STAs in the group are able to estimate the channel and interference respectively. A possible solution for this is that the TRN units are chosen to correspond to the same stream indexes as previously used for the i-th STA, or they can be predefined in a standard e.g., use first $L_s$ MIMO TRN sequences.

An alternative is to send the TRNs with a digital beamforming training matrix of the same dimension as the one used during the data part of the DL PPDU. In this case the Q matrices are replacing the columns of the $F_{BB}$ matrices corresponding to the i-th user whereas all other columns remain the same. This allows for a smoother transition between the data part of the PPDU and the training parts, however may incur more processing at the receivers. In this case, the same MIMO TRNs are utilized for the same streams and users, without the need for additional definitions.

When a calibration procedure can be performed in a stage prior to the actual MU DL transmission and tracking, in order to ensure that the downlink and uplink effective channels are similar or the differences between them can be compensated, simplifications to the CSI acquisition and hybrid beam tracking can be devised, by employing the effective channel information from the uplink.

One option how the obtained effective reciprocity can be used within the hybrid or analog beam tracking protocols proposed so far, is as an alternative to obtaining the channel information after the hybrid TX beamforming tracking for example, in case it is difficult to perform on the same PPDU, both an analog beam selection and a good enough channel estimation for the selected beam, i.e., good enough to further allow for the digital beamforming computation. To leverage the effective uplink downlink reciprocity, the i-th STA will transmit during the next UL PPDU with the chosen analog beamforming matrix (the one utilized to receive the training unit used for tracking, or the one which resulted the best reception for a training unit) and the transmission is such as to allow the AP to estimate the effective downlink channel and complete the necessary digital beamforming matrix itself. Also, it can be used by STAs which have received interference during the TRN transmission with the digital beamforming training matrix. By allowing the AP to estimate the effective downlink channels from the effective uplink channels, it is possible to update the Q matrix and reattempt the tracking with the next MU PPDU.

In order to obtain the latest channel information but avoid the feedback overheads, the AP requests particular STAs to transmit the acknowledgments or UL PPDU in such way as to allow this estimation.

Normally, just for acknowledgements it is not necessary for STAs to transmit multiple streams in the UL. Furthermore, the number of streams in the UL may differ from the number of streams to be used in DL, therefore even if STAs transmit acknowledgements for multiple streams without digital beamforming, the channel estimation fields within the UL PPDU would be smaller than the required number to obtain the necessary channel.

Therefore, in order to allow the AP to obtain the necessary DL channel estimates, STAs should send the UL PPDU including an acknowledgement either in MIMO mode without precoding and using the same set of antennas and RF chains as used for the reception of the packet or STAs may send in digital beamforming mode but then append a number of MIMO TRN units equal to the number of receive RF chains.

In comparison, for a full channel estimation without reciprocity, it is necessary for the AP to append MIMO TRNs unprecoded corresponding to all RF chains used in the transmission and for the STAs to assemble a relatively complicated feedback report, which is avoided by the present disclosure.

Figure 12:
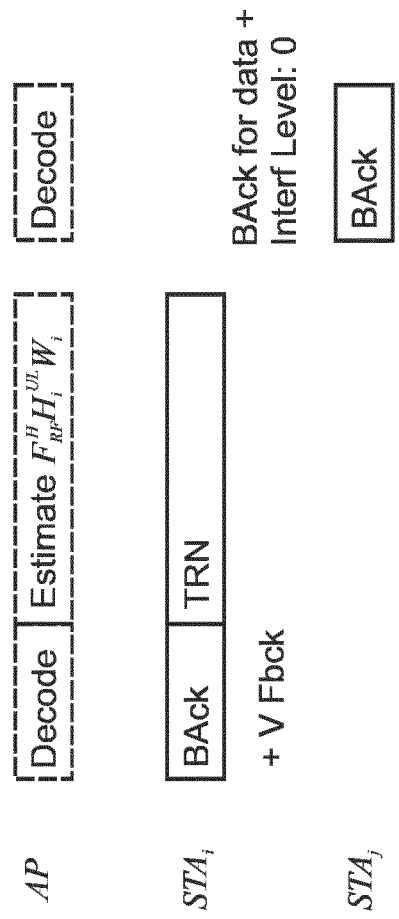
FIG. 12 shows a diagram illustrating an uplink phase in the case when reciprocity calibration is used.

A diagram illustrating an uplink phase in the case when reciprocity calibration is used is depicted in FIG. 12. As shown there, UL frames such as Acknowledgement (Ack) or Block Acknowledgement (BAck) frames are sent in MIMO mode and TRN fields corresponding to number of antennas used by STA RX are attached. Within the previous DL PPDU, the BAck schedule contains updated times for the STAs so as to consider the TRN transmission for $STA_i$. If interference level=1, the tracking will be performed again for both i and k with extended Q matrix.

In an embodiment an indication on link stability may be used. In order to give the AP a priori information on the links, which may be more unstable than the others, a possible solution is to define at each STAs a metric based on e.g. beamwidth, pointing angle towards AP, motion level, and indicate the value of this before the MU DL data transfer starts. This will be implementation dependent and will represent a tradeoff between accuracy and complexity as (i) the more accurate the CSI knowledge of the i-th STA is at the AP, the less interference is STAi expected to experience, and (ii) the more accurate the CSI is at the AP, the more effort needs to be put in estimating and assembling the feedbacks.

The value of this metric will be transmitted to the AP after the beam training and can be updated, e.g. during a tracking request or after a beam modification has been performed. For a specific STA, this metric will be correlated with information on the pointing angle and beamwidth used at the AP to give the latter an indication on the expected stability of the channel. This final metric can be finally used by the AP to preemptively append training sequences for the STAs with values indicating possibly more unstable links.

In another embodiment an approach on how a STA can decide if analog or hybrid beamforming is required may be applied. It includes estimating the non-digitally beamformed channels, e.g. in the case of WLAN 60 GHz, based on legacy estimation sequences, which are sent before the PPDUs, and comparing them with previous estimates gained based on these fields of previous PPDUs. It further includes estimating the digitally beamformed channels, e.g. in the case of 60 GHz WLAN, based on MIMO channel estimation sequences.

If the received power for the channel without digital beamforming changes significantly with respect to previous packet estimation then analog tracking may be triggered. If received power on the non-digitally beamformed is not significantly changed but the MIMO estimation has, or if the SNR has worsened or the error rate has enlarged, digital tracking is requested.

Figure 13:
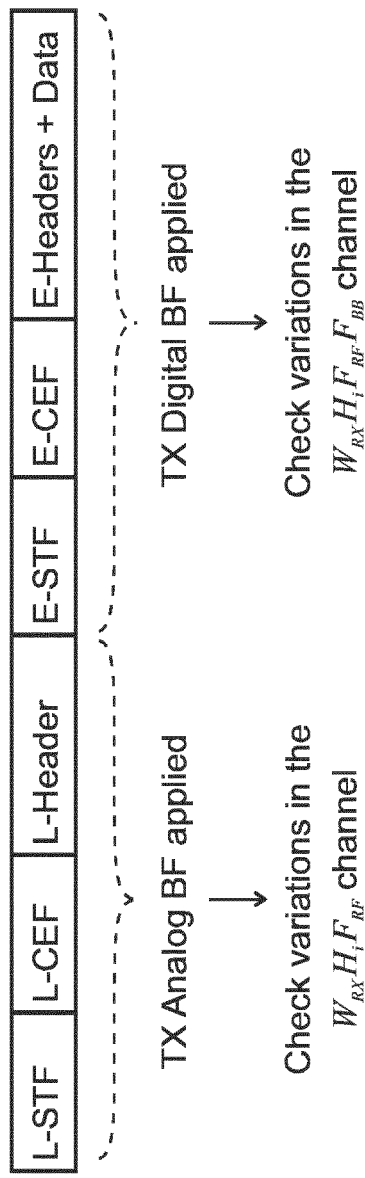
FIG. 13 shows the format of a transmit packet (PPDU) in which both analog and digital beamforming is applied.

FIG. 13 shows the format of a transmit packet (PPDU) in which both analog and digital beamforming is applied.

The type of tracking needed can e.g. be inferred from retransmission rate or SNR/SINR reduction or UL channel deviation by evaluating if the difference between the a function of the instantaneous effective channel information and of the statistical effective channel information is above a certain threshold e.g., by evaluating a distance function:

$$d_*(h_i^{(UL)}h_i^{(UL),H}, R_i^{(UL)}) \leq \gamma_i \qquad (10)$$

with $d_*(.,.)$ standing for a distance metric of choice e.g., Frobenius norm, Riemannian distance, wherein the arguments may represent instantaneous and statistical effective channel knowledge respectively or functions of the instantaneous and statistical effective channel knowledge. AP requires tracking for STA i if inequality does not hold.

Alternatively, an AP can preemptively request STAs to perform tracking if these are at angles for which the coherence times vary faster. Alternatively, the AP can preemptively schedule tracking of various STAs during the MU data transmission, according to the level of mobility of a STA (as e.g. indicated by the STA through some IMU based data).

The signaling content to enable the tracking operation as described above may include an indication of tracking within a header bearing common information for all STAs (e.g., Header A) or a control part of a packet: All STAs should know that TRNs are appended and precoded, as normally the TRNs attached are not precoded. The dimension of the Q matrix used for the precoding of the TRNs may be indicated in one of the headers.

Further, an indication of Digital Tracking may be provided within a header bearing specific information for each STA (Header B) or within a control part of a packet to inform a particular STA whether the tracking request is intended for itself or some other STA. If it is intended for itself, it should send back feedback as indicated by the AP e.g., for the analog and/or digital training matrix corresponding to the best receive training unit, in the format requested by the AP, or for all precoders used by the AP. If the tracking request is not intended for itself, it can still estimate the interference level created. If any of them is giving interference levels larger than permitted, this should be indicated to the AP with the next opportunity.

A possible way to indicate this information is to use a control trailer attached to the next PPDU sent in uplink, e.g. a BAck frame, whereas the control trailer contains information about the SNRs on the particular. An indication whether STAs non targeted by the tracking are receiving interference above a predefined threshold should be reported to the AP, e.g., attached to acknowledgement frames. To enable STAs to prepare the feedback report, the AP may schedule the Ack response from the STA performing tracking at the end of the Ack round.

The present disclosure may provide one or more of the following advantages. It may allow analog beamforming realignments and/or digital beamforming computations for some STAs without changing the beamforming configurations of STAs with stable links. A reduced feedback overhead may be needed. The computational efficiency at the STA may be increased due to reduced estimation dimension and the computational efficiency at the AP may be increased due to reusability of rotation matrices.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A first communication device comprising circuitry configured to simultaneously transmit to a group of two or more second communication devices using multi-user multiple input multiple output, MU-MIMO, communication;

perform beamforming training with a selected second communication device of said group of second communication devices by transmitting one or more transmit packets including one or more training units, wherein an analog beamforming training matrix and/or a digital beamforming training matrix adapted for beamforming training with the selected second communication device are applied on the one or more training units, receiving from the selected second communication device feedback in response to the transmitted transmit packets, said feedback including beamforming information determined by the selected second communication device based on the reception of the transmit packets, and determining, for use in the simultaneous transmission of data to a group of two or more second communication devices including the selected second communication device, an updated analog beamforming matrix based on the analog beamforming training matrix and the received feedback and/or an updated digital beamforming matrix based on the digital beamforming training matrix and/or the received feedback.

2. The first communication device as defined in embodiment 1, wherein the circuitry is configured to transmit packets to the two or more second communication devices, wherein a first part of a transmit packet carries data for data communication with the two or more second communication devices and a second part of the transmit packet carries the one or more training units intended for the selected second communication device, wherein the first part of the transmit packet is transmitted with an initial digital beamforming matrix and/or an initial analog beamforming matrix and the second part of the transmit packet is transmitted with a digital beamforming training matrix and/or an analog beamforming training matrix.

3. The first communication device as defined in embodiment 2, wherein the parts of the analog beamforming training matrix corresponding to the selected second communication device and the initial analog beamforming matrix differ.

4. The first communication device as defined in any one of the preceding embodiments, wherein the circuitry is configured to include an indication of the selected second communication device and/or an indication that one or more digital beamforming training matrices and/or analog beamforming matrices are applied on the one or more training units in one or more transmit packets.

5. The first communication device as defined in any one of the preceding embodiments, wherein the circuitry is configured to include an indication of the selected second communication device in one or more transmit packets, in particular in the header of the one or more transmit packets.

6. The first communication device as defined in any one of the preceding embodiments, wherein the circuitry is configured to receive feedback including a digital beamforming feedback matrix from the selected second communication device and to determine the updated digital beamforming matrix from the digital beamforming training matrix and the received digital beamforming feedback matrix.

7. The first communication device as defined in any one of the preceding embodiments, wherein the circuitry is configured to receive feedback from the selected second communication device including information indicating the training unit resulting in the best value of a reception metric and/or digital beamforming feedback information comprising one or more of:

signal-to-noise information per stream, signal-to-noise information per training unit or group of training units, elements of digital beamforming feedback matrix in uncompressed form, set of angles corresponding to a digital beamforming matrix in compressed form by means of Givens rotations.

8. The first communication device as defined in any one of the preceding embodiments, wherein the circuitry is configured to receive feedback including information indicating the training unit resulting in the best value of a reception metric.

9. The first communication device as defined in any one of the preceding embodiments, wherein the circuitry is configured to receive interference feedback from one or more non-selected second communication devices of the group different from the selected second communication device, said interference feedback indicating the training unit causing interference at the one or more non-selected second communication device and optionally indicating the interference level or a measure allowing deriving the interference level of the interference caused by the training unit.

10. The first communication device as defined in any one of the preceding embodiments, wherein the circuitry is configured to compute the digital beamforming training matrix by choosing one or more analog beam combinations;

for each analog beam combination, compute an interference matrix based on channel state information from a previous beamforming training and compute the digital beamforming training matrix by selecting rotation matrices and/or computing null vectors such that the interference at non-selected second communication devices is minimized or null.

11. The first communication device as defined in embodiment 2, wherein the circuitry is configured to compute the updated digital beamforming matrix by updating in the initial digital beamforming matrix used for data communication the rows and/or columns corresponding to the selected second communication device with a matrix obtained by multiplying the digital beamforming training matrix with a non-compressed second digital beamforming matrix, obtained from the beamforming information included in the received feedback.

12. The first communication device as defined in any one of the preceding embodiments, wherein the circuitry is configured to transmit one or more transmit packets each including multiple training units, wherein the analog beamforming training matrix and/or the digital beamforming training matrix applied on each training unit or group of training units changes from training unit to training unit or from group of training units to group of training units and is different than an initial analog beamforming matrix and/or initial digital beamforming matrix applied for transmitting the data part of the packet.

13. The first communication device as defined in any one of the preceding embodiments,
wherein the circuitry is configured to apply an analog beamforming training matrix that is the same as an initial analog beamforming matrix used for transmitting the data part of the transmit packets and/or a digital beamforming training matrix on one or more training units for training with the selected second communication device.

14. The first communication device as defined in any one of the preceding embodiments,
wherein the circuitry is configured to receive transmit packets including one or more training units from the selected second communication device and to estimate the channel based on the received training units.

15. The first communication device as defined in any one of the preceding embodiments,
wherein the circuitry is configured to receive channel state information from one or more second communication devices of said group indicating respective stable and/or unstable channels and to use the received channel state information to preemptively perform beamforming training with second communication devices that transmitted channel state information indicating that the channel with the first communication device is unstable.

16. The first communication device as defined in any one of the preceding embodiments,
wherein the circuitry is configured to initiate beamforming training with a selected second communication device if
 a second communication device requests beamforming training, and/or
 a retransmission rate requested by a second communication device exceed a threshold, and/or
 one or more channel estimates indicates an unstable channel, or
 variations in an analog beamformed channel and/or a digital beamformed channel exceed a threshold, and/or
 the mobility of a second communication device exceeds a threshold or is larger than the mobility of other second communication devices, and/or
 the position of a second communication device has changed by an extent larger than a threshold or to a position resulting in a beam angle for which coherence time varies faster than before or faster than a threshold.

17. The first communication device as defined in any one of the preceding embodiments,
wherein the circuitry is configured to include an indication that and/or how the one or more training units are precoded by the digital beamforming training matrix in one or more transmit packets, in particular in a header of one or more transmit packets.

18. The first communication device as defined in any one of the preceding embodiments,
wherein the circuitry is configured to communicate with the two or more second communication devices using the updated analog beamforming matrix and/or the updated digital beamforming matrix.

19. The first communication device as defined in any one of the preceding embodiments,
wherein the digital beamforming training matrix is designed to minimize interference to one or more non-selected second communication devices for one or more analog beam combinations corresponding to an analog beamforming training matrix.

20. The first communication device as defined in any one of the preceding embodiments,
wherein the analog beamforming training matrix is designed to maximize the probability of reception with a signal strength larger than a threshold by the selected second communication device.

21. The first communication device as defined in any one of the preceding embodiments,
wherein the analog beamforming training matrix is designed to maximize the probability of reception by setting phase shifters such that the resulting analog beams cover neighboring sectors to the ones used for communication, or by steering the analog beams in the direction of alternative strong paths towards the selected second communication device, or by steering the analog beams towards angles determined based on position or motion information indicated by the selected second communication device in a previous transmission stage.

22. The first communication device as defined in any one of the preceding embodiments,
wherein the circuitry is configured to determine an updated analog beamforming matrix based on the indication of the best received training unit included in the feedback received from the selected second communication device and/or based on the analog beamforming training matrix applied on the training unit indicated in the feedback received from the selected communication device.

23. The first communication device as defined in any one of the preceding embodiments,
wherein the digital beamforming training matrix applied on the training units has a lower dimension than the digital beamforming matrix applied during the transmission of the data packet.

24. A second communication device comprising circuitry configured to
 communicate with a first communication device that is configured to simultaneously transmit to a group of two or more second communication devices using multi-user multiple input multiple output, MU-MIMO, communication;
 perform beamforming training with the first communication device by
  receiving one or more transmit packets including one or more training units, wherein an analog beamforming training matrix and/or a digital beamforming training matrix adapted for beamforming training with the second communication device are applied on the training units by the first communication device,
  determining beamforming information based on the reception of the transmit packets, and
  transmitting to the first communication device feedback in response to the received transmit packets, said feedback including the determined beamforming information.

25. The second communication device as defined in embodiment 24,
wherein the circuitry is configured to use a fixed receive analog beamforming matrix to receive the one or more transmit packets including one or more training units.

26. The second communication device as defined in embodiment 24 or 25,
wherein the circuitry is configured to change the receive analog beamforming matrix during the reception of each training unit or of each group of training units included in the one or more transmit packet.

27. The second communication device as defined in any one of embodiments 19 to 26, wherein the circuitry is configured to transmit beamforming feedback information to the first communication device, including one or more of an indication of the training unit resulting in the best metric for reception, an indication of the channel quality or received signal strength or signal to noise ratio for the training unit resulting in the best metric for reception, the elements of a digital beamforming feedback matrix computed for the training unit received with best metric, and a set of angles corresponding to a compression with Givens rotation matrices of a digital beamforming matrix computed for the training unit received with the best metric 28. The second communication device as defined in any one of embodiments 24 to 27, wherein the circuitry is configured to transmit interference feedback to the first communication device if the second communication device is not selected for performing beamforming training, said interference feedback indicating the training unit causing interference at the second communication device and optionally indicating the interference level or a measure allowing deriving the interference level of the interference caused by the training unit.

29. The second communication device as defined in any one of embodiments 24 to 27, wherein the circuitry is configured to transmit packets including one or more training units enabling the first communication device to estimate or derive channel information.

30. The second communication device as defined in any one of embodiments 24 to 27, wherein the circuitry is configured to transmit channel state information to the first communication device indicating stable and/or unstable channels.

31. The second communication device as defined in any one of embodiments 24 to 29, wherein the circuitry is configured to compute the digital beamforming feedback matrix based on the analog beamforming matrix used by the first communication device for transmitting the transmit packet and an analog beamforming matrix used by the second communication unit for receiving the transmit packets with strongest power.

32. The second communication device as defined in any one of embodiments 24 to 31, wherein the circuitry is configured to evaluate the best received training unit and send back an indication of the best received training unit to the first communication device.

33. The second communication device as defined in embodiment 32, wherein the circuitry is configured to determine an updated analog receive beamforming matrix according to an analog receive beamforming configuration used in the reception of the best training unit.

34. The second communication device as defined in any one of embodiments 24 to 33, wherein the circuitry is configured to transmit packets with at least as many training units as receive RF chains used within the communication with the first communication device, to enable the first communication device to derive effective channel information from the first communication device to the second communication device.

35. A first communication method comprising simultaneously transmitting to a group of two or more second communication devices using multi-user multiple input multiple output, MU-MIMO, communication;

performing beamforming training with a selected second communication device of said group of second communication devices by transmitting one or more transmit packets including one or more training units, wherein on the one or more training units an analog beamforming training matrix and/or a digital beamforming training matrix adapted for beamforming training with the selected second communication device are applied, receiving from the selected second communication device feedback in response to the transmitted transmit packets, said feedback including beamforming information determining by the selected second communication device based on the reception of the transmit packets, and determining, for use in the simultaneous transmission of data to a group of two or more second communication devices including the selected second communication device, an updated analog beamforming matrix based on the analog beamforming training matrix and the received feedback and/or an updated digital beamforming matrix based on the digital beamforming training matrix and/or the received feedback.

36. A second communication method comprising communicating with a first communication device that is configured to simultaneously transmit to a group of two or more second communication devices using multi-user multiple input multiple output, MU-MIMO, communication;

performing beamforming training with the first communication device by receiving one or more transmit packets including one or more training units, wherein an analog beamforming training matrix and/or a digital beamforming training matrix adapted for beamforming training with the second communication device are applied on the training units by the first communication device, determining beamforming information based on the reception of the transmit packets, and transmitting to the first communication device feedback in response to the received transmit packets, said feedback including the determined beamforming information.

37. A non-transitory computer-readable recording medium that stores therein a computer program product, which, when executed by a processor, causes the steps of the embodiment 35 or 36 to be performed.

38. A computer program comprising program code means for causing a computer to perform the steps of said method according to embodiment 35 or 36 when said computer program is carried out on a computer.

39. A first communication device comprising circuitry configured to simultaneously transmit to a group of two or more second communication devices using multi-user multiple input multiple output, MU-MIMO, communication;

perform beamforming correction training with at least one selected second communication device of said group of second communication devices (but not with all second communication devices of said group) by transmitting one or more transmit packets including one or more training units to the group of second communication devices, wherein an analog beamforming training matrix and/or a digital beamforming training matrix adapted for beamforming training with the selected second communication device are applied on the one or more training units, receiving from the selected second communication device feedback in response to the transmitted transmit packets, said feedback including beamforming information determined by the selected second communication device based on the reception of the transmit packets, and determining, for use in the simultaneous transmission of data to a group of two or more second communication devices including the selected second communication device, an updated analog beamforming matrix based on the analog beamforming training matrix and the received feedback and/or an updated digital beamforming matrix based on the digital beamforming training matrix and/or the received feedback.

The invention claimed is:

1. A first communication device comprising circuitry configured to simultaneously transmit to a group of two or more second communication devices using multi-user multiple input multiple output (MU-MIMO) communication; and perform beamforming training with a selected at least one second communication device of said group of second communication devices by transmitting one or more transmit packets, wherein, for each of the one or more transmit packets, a first part carries data for data communication with the two or more second communication devices and a second part carries one or more training units for beamform training of only the selected at least one second communication device of the second communication devices of the group, wherein an analog beamforming training matrix and/or a digital beamforming training matrix adapted for the beamforming training with only the selected at least one second communication device are/is applied on the one or more training units for the beamform training of only the selected at least one second communication device, receiving from the selected at least one second communication device feedback in response to the transmitted one or more transmit packets, said feedback including beamforming information determined by the selected at least one second communication device based on the reception of the one or more transmit packets that include the first and second parts, and determining, for use in the simultaneous transmission of data to the group of two or more second communication devices including the selected at least one second communication device, an updated analog beamforming matrix based on the analog beamforming training matrix and the received feedback and/or an updated digital beamforming matrix based on the digital beamforming training matrix and/or the received feedback.

2. The first communication device as claimed in claim 1, wherein the first part of each said one or more transmit packet is transmitted with an initial digital beamforming matrix and/or an initial analog beamforming matrix, and the second part of each said one or more transmit packet is transmitted with the digital beamforming training matrix and/or the analog beamforming training matrix, and the digital beamforming training matrix is adapted for creating minimum or null interference for each non-selected second communication device or devices.

3. The first communication device as claimed in claim 2, wherein respective parts of the analog beamforming training matrix corresponding to the selected at least one second communication device and the initial analog beamforming matrix differ.

4. The first communication device as claimed in claim 1, wherein the circuitry is configured to include an indication of the selected at least one second communication device and/or an indication that one or more digital beamforming training matrices and/or one or more analog beamforming matrices are applied on the one or more training units.

5. The first communication device as claimed in claim 1, wherein the circuitry is configured to receive feedback from the selected at least one second communication device including information indicating one of the one or more training units resulting in the best value of a reception metric and/or digital beamforming feedback information comprising one or more of:

signal-to-noise information per stream, signal-to-noise information per training unit or group of training units, elements of digital beamforming feedback matrix in uncompressed form, set of angles corresponding to a digital beamforming matrix in compressed form by Givens rotations.

6. The first communication device as claimed in claim 1, wherein the circuitry is configured to receive interference feedback from one or more non-selected second communication devices of the group different from the selected at least one second communication device, said interference feedback indicating one of the one or more training units that causes interference at the one or more non-selected second communication device and/or that indicates an interference level or a measure allowing deriving the interference level of the interference caused by the one training unit of the one or more training units.

7. The first communication device as claimed in claim 1, wherein the circuitry is configured to compute the digital beamforming training matrix by choosing one or more analog beam combinations; and for each analog beam combination, compute an interference matrix based on channel state information from a previous beamforming training and compute the digital beamforming training matrix by selecting rotation matrices and/or computing null vectors such that the interference at non-selected second communication devices is minimized or null.

8. The first communication device as claimed in claim 2, wherein the circuitry is configured to compute the updated digital beamforming matrix by updating in the initial digital beamforming matrix used for data communication the rows and/or columns corresponding to the selected at least one second communication device with a matrix obtained by multiplying the digital beamforming training matrix with a non-compressed second digital beamforming matrix, obtained from the beamforming information included in the received feedback.

9. The first communication device as claimed in claim 1, wherein the circuitry is configured to transmit the one or more transmit packets each including multiple training units, wherein the analog beamforming training matrix and/or the digital beamforming training matrix applied on each training unit or group of training units changes from training unit to training unit or from group of training units to group of training units and is different than an initial analog beamforming, matrix and/or initial digital beamforming matrix applied for transmitting the data part of the packet.

10. The first communication device as claimed in claim 1, wherein the circuit is configured to apply an analog beamforming training matrix that is the same as an initial analog beamforming matrix used for transmitting the data part of the one or more transmit packets and/or a digital beamforming training matrix on one or more training units for training with the selected at least one second communication device.

11. The first communication device as claimed in claim 1, wherein the circuitry is configured to receive the one or more transmit packets including one or more training units from the selected at least one second communication device and to estimate the channel based on the received training units and/or to receive channel state information from one or more second communication devices of said group indicating respective stable and/or unstable channels and to use the received channel state information to preemptively perform beamforming training with only the at least one second communication devices that transmitted channel state information indicating that the channel with the first communication device is unstable.

12. A second communication device comprising circuitry configured to
communicate with a first communication device that is configured to simultaneously transmit to a group of two or more second communication devices, including said second communication device as at least one selected second communication device of the group of second communication devices, using multi-user multiple input multiple output (MU-MIMO) communication; and
perform beamforming training with the first communication device by
receiving one or more transmit packets, wherein, for each of the one or more transmit packets, a first part carries data for data communication with the two or more second communication devices and a second part carries one or more training units for beamform training of only the selected at least one second communication device of the second communication devices of the group, wherein an analog beamforming training matrix and/or a digital beamforming training matrix adapted for the beamforming training with only the selected at least one second communication device are/is applied on the one or more training units by the first communication device for the beamform training of only the selected at least one second communication device,
determining beamforming information based on the reception of the one or more transmit packets, and
transmitting to the first communication device feedback in response to the received one or more transmit packets, said feedback including the determined beamforming information.

13. The second communication device as claimed in claim 12, wherein the circuitry is configured to use a fixed receive analog beamforming matrix to receive the one or more transmit packets including the one or more training units.

14. The second communication device as claimed in claim 12, wherein the circuitry is configured to change the receive analog beamforming matrix during the reception of each training unit or of each group of training units included in the one or more training packet.

15. The second communication device as claimed in claim 12, wherein the circuitry is configured to transmit the feedback beamforming information to the first communication device, including one or more of
an indication of the training unit resulting in the best metric for reception,
an indication of the channel quality or received signal strength or signal to noise ratio for the training unit resulting in the best metric for reception,
the elements of a digital beamforming feedback matrix computed for the training unit received with best metric, and
a set of angles corresponding to a compression with Givens rotation matrices of a digital beamforming, matrix computed for the training unit received with the best metric.

16. The second communication device as claimed in claim 12, wherein the circuitry is configured to transmit one or more of
interference feedback to the first communication device under a condition that the second communication device is not selected for performing the beamforming training, said interference feedback indicating the training unit causing interference at the second communication device and indicating an interference level or a measure allowing deriving the interference level of the interference caused by the training unit;
transmit packets including one or more training units enabling the first communication device to estimate the channel; and
channel state information to the first communication device indicating stable and/or unstable channels.

17. The second communication device as claimed in claim 12, wherein the circuitry is configured to compute the digital beamforming training matrix based on the analog beamforming matrix used by the first communication device for transmitting the one or more transmit packets and an analog beamforming matrix used by the second communication unit for receiving the one or more transmit packets with strongest power, and
wherein the analog beamforming training matrix and/or the digital beamforming training matrix are/is adapted for creating minimum or null interference for each non-selected second communication device or devices.

18. A first communication method comprising:
simultaneously transmitting to a group of two or more second communication devices using multi-user multiple input multiple output, (MU-MIMO) communication; and
performing beamforming training with a selected second communication device of said group of second communication devices by
transmitting one or more transmit packets, wherein, for each of the one or more transmit packets, a first part carries data for data communication with the two or more second communication devices and a second part carries one or more training units for beamform training of only the selected second communication device of the second communication devices of the group, wherein on the one or more training units an analog beamforming training matrix and/or a digital beamforming training matrix adapted for the beamforming training with only the selected second communication device are/is applied for the beamform training of only the selected second communication device,
receiving from the selected second communication device feedback in response to the transmitted one or more transmit packets, said feedback including beamforming information determining by the selected second communication device based on the reception of the one or more transmit packets that include the first and second parts, and determining, for use in the simultaneous transmission of data to the group of two or more second communication devices including the selected second communication device, an updated analog beamforming matrix based on the analog beamforming training matrix and the received feedback and/or an updated digital beamforming matrix based on the digital beamforming training matrix and/or the received feedback.

19. A second communication method of communicating for a second communication device, the second communication method comprising:

communicating with a first communication device that is configured to simultaneously transmit to a group of two or more second communication devices, including said second communication device as a selected second communication device of the group of second communication devices, using multi-user multiple input multiple output (MU-MIMO) communication; and performing beamforming training between the selected second communication device and the first communication device by receiving one or more transmit packets, wherein, for each of the one or more transmit packets, a first part carries data for data communication with the two or more second communication devices and a second part carries one or more training units for beamform training of only the selected second communication device of the second communication devices of the group, wherein an analog beamforming training matrix and/or a digital beamforming training matrix adapted for the beamforming training with only the second communication device are/is applied on the one or more training units by the first communication device for the beamform training of only the selected second communication device, determining beamforming information based on the reception of the one or more transmit packets, and transmitting to the first communication device feedback in response to the received one or more transmit packets, said feedback including the determined beamforming information.

20. A non-transitory computer-readable recording medium that stores therein a computer program product, which, when executed by a processor, causes the method according to claim 18 to be performed.

* * * * *